US012618785B1

(12) United States Patent　　　　　　(10) Patent No.:　US 12,618,785 B1

Dowell et al.　　　　　　　　　　　　　(45) Date of Patent:　May 5, 2026

(54) SYSTEMS AND METHODS OF COSMIC RAY SENSING OF SOIL MOISTURE FOR TURF GRASS AND CROP MANAGEMENT

(71) Applicant: QUAESTA INSTRUMENTS, LLC, Tucson, AZ (US)

(72) Inventors: Jonathan Dowell, Los Alamos, NM (US); Steven Hamann, Oro Valley, AZ (US)

(73) Assignee: QUAESTA INSTRUMENTS, LLC, Tucson, AZ (US)

( * ) Notice: Subject to any disclaimer, the term of this patent is extended or adjusted under 35 U.S.C. 154(b) by 392 days.

(21) Appl. No.: 17/973,229

(22) Filed: Oct. 25, 2022

Related U.S. Application Data

(60) Provisional application No. 63/271,626, filed on Oct. 25, 2021.

(51) Int. Cl.
G01N 23/02　　　　(2006.01)

(52) U.S. Cl.
CPC ................................. G01N 23/025 (2013.01)

(58) Field of Classification Search
CPC ................................................... G01N 23/025
See application file for complete search history.

(56) References Cited

U.S. PATENT DOCUMENTS

| 2,928,965 A | | 3/1960 | Bayard et al. | |
| 3,602,713 A | * | 8/1971 | Kastner | G01N 23/09 |
| | | | | 250/390.05 |

| 4,047,042 A | | 9/1977 | Wada et al. | 250/390 |
| 4,463,264 A | | 7/1984 | Young et al. | 250/390 |
| 4,645,935 A | | 2/1987 | Salaita | |

(Continued)

FOREIGN PATENT DOCUMENTS

| EP | 3324182 A1 | * | 5/2018 | G01N 23/204 |
| JP | H05322735 A | * | 12/1993 | |

OTHER PUBLICATIONS

Han et al., Soil Moisture Estimation Using Cosmic-Ray Soil Moisture Sensing at Heterogeneous Farmland, IEEE Geoscience and Remote Sensing Letters,vol. 11,No. 9, pp. 1659-1663. (Year: 2014).*

(Continued)

*Primary Examiner* — Kiho Kim

(74) *Attorney, Agent, or Firm* — HAYES SOLOWAY P.C.

(57)　　　　　　ABSTRACT

Methods and systems for cosmic ray sensing soil moisture management included at least one cosmic ray sensor (CRS) positioned within an environment. The CRS detects a plurality of cosmogenic neutrons from a portion of the environment. A computing platform is in communication with the at least one CRS. Data corresponding to the detected plurality of cosmogenic neutrons is communicated to the computing platform. A processing system is within the computing platform. The processing system determines a moisture level within the portion of the environment based on the detected plurality of cosmogenic neutrons. The processing system is configured to activate an irrigation controller which controls an irrigation network positioned at least partially within the portion of the environment based on the determined moisture level. The methods and systems may be used to manage moisture levels within agricultural crops and turf grass, such as on golf courses.

19 Claims, 14 Drawing Sheets

(56) References Cited

U.S. PATENT DOCUMENTS

| | | | | |
|---|---|---|---|---|
| 4,992,667 | A | * | 2/1991 | Abelentsev ............ G01N 23/09 |
| | | | | 250/390.05 |
| 5,083,029 | A | | 1/1992 | Buchanan ................ 250/390.05 |
| 5,258,622 | A | | 11/1993 | Pratt, Jr. |
| 5,321,269 | A | | 6/1994 | Kitaguchi et al. |
| 5,502,303 | A | | 3/1996 | Gonzalez-Lepéra ...... 250/252.1 |
| 7,078,705 | B1 | | 7/2006 | Ianakiev et al. ......... 250/390.01 |
| 7,233,007 | B2 | | 6/2007 | Downing et al. ........ 250/390.11 |
| 7,514,694 | B2 | | 4/2009 | Stephan et al. .......... 250/390.01 |
| 7,902,513 | B2 | | 3/2011 | Kub et al. |
| 8,217,360 | B2 | | 7/2012 | Nukatsuka et al. ..... 250/370.11 |
| 8,653,470 | B2 | | 2/2014 | Dubeau .................... 250/390.07 |
| 8,796,634 | B2 | | 8/2014 | Kisner et al. |
| 9,029,788 | B2 | | 5/2015 | Yang et al. |
| 9,081,100 | B1 | | 7/2015 | Bellinger et al. |
| 9,329,303 | B2 | | 5/2016 | Inanc et al. |
| 9,395,454 | B2 | | 7/2016 | Orava et al. |
| 9,442,202 | B2 | | 9/2016 | Tanner et al. |
| 9,638,813 | B2 | | 5/2017 | Stowe .................... C30B 29/46 |
| 9,678,229 | B2 | | 6/2017 | Neyland |
| 9,778,392 | B2 | | 10/2017 | Justus et al. |
| 9,817,138 | B2 | | 11/2017 | McGregor et al. |
| 9,910,170 | B1 | | 3/2018 | Billiard et al. |
| 9,939,538 | B2 | | 4/2018 | Ing et al. |
| 9,958,561 | B2 | | 5/2018 | Bellinger et al. |
| 9,978,384 | B2 | | 5/2018 | Li et al. |
| 10,024,986 | B2 | | 7/2018 | Lennert et al. |
| 10,564,112 | B2 | | 2/2020 | Zreda et al. |
| 10,845,318 | B2 | | 11/2020 | Zreda et al. |
| 10,890,677 | B2 | | 1/2021 | Larue |
| 11,063,553 | B2 | | 7/2021 | Poivet |
| 11,249,036 | B2 | | 2/2022 | Zreda et al. |
| 11,474,048 | B2 | | 10/2022 | Zreda et al. |
| 2001/0046274 | A1 | | 11/2001 | Craig et al. .................... 376/154 |
| 2003/0012324 | A1 | | 1/2003 | Haruyama .................... 376/159 |
| 2004/0061047 | A1 | | 4/2004 | Bolozdynya et al. .......... 250/25 |
| 2005/0023479 | A1 | | 2/2005 | Grodzins .............. G01N 23/10 |
| 2006/0023828 | A1 | | 2/2006 | McGregor et al. ........... 376/158 |
| 2006/0138340 | A1 | | 6/2006 | Ianakiev et al. ......... 250/390.01 |
| 2008/0210880 | A1 | | 9/2008 | Baroni et al. .................. 250/390 |
| 2011/0180718 | A1 | | 7/2011 | Luszik-Bharda et al. .................. |
| | | | | 250/390.03 |
| 2013/0341519 | A1 | | 12/2013 | Li et al. |
| 2014/0158893 | A1 | | 6/2014 | Platt et al. |
| 2014/0158895 | A1 | | 6/2014 | Wang et al. |
| 2014/0361187 | A1 | | 12/2014 | Zhao et al. |
| 2015/0014234 | A1 | | 1/2015 | Early et al. |
| 2015/0241577 | A1 | | 8/2015 | Spillane et al. .......... G01T 3/00 |
| 2015/0355345 | A1 | | 12/2015 | Neyland ................. G01T 3/008 |
| 2016/0356901 | A1 | | 12/2016 | Shao et al. ............... G01T 3/08 |
| 2017/0023684 | A1 | | 1/2017 | Inglis et al. ............ G01T 3/008 |
| 2017/0059723 | A1 | | 3/2017 | Ing et al. ................. G01T 3/065 |
| 2017/0090049 | A1 | | 3/2017 | Ramsden et al. ......... G01T 3/06 |
| 2017/0184736 | A1 | | 6/2017 | Ramsden et al. ......... G01T 3/06 |
| 2017/0247737 | A1 | | 8/2017 | Gundry et al. .......... C12Q 1/06 |
| 2018/0299570 | A1 | | 10/2018 | Degtiarenko ............. G01T 7/00 |
| 2018/0341032 | A1 | * | 11/2018 | Larue .................... G01N 23/20 |
| 2019/0178818 | A1 | * | 6/2019 | Zreda .................. G01N 33/246 |
| 2020/0036325 | A1 | | 1/2020 | Poivet .................... H02S 30/10 |
| 2021/0102906 | A1 | | 4/2021 | Zreda et al. .......... G01N 23/09 |

OTHER PUBLICATIONS

Office Action issued in EP application serial No. 18 887 019.0 dated Jun. 16, 2023, 9 pgs.

Office Action issued in U.S. Appl. No. 17/499,614 dated Mar. 16, 2023, 24 pgs.

European Search Report issued in EP Appln. No. 23 155 661.4, dated May 31, 2023, 9 pgs.

Office Action issued in U.S. Appl. No. 17/499,614, dated Aug. 18, 2023, 9 pgs.

Andreasen et al., "Cosmic-ray neutron transport at a forest field site: the sensitivity to various environmental conditions with focus on biomass and canopy interception", Hydrology and Earth System Sciences, vol. 21, No. 4, Apr. 3, 2017, 20 pgs.

Desilets, D., and M. Zreda, 2013. Footprint diameter for a cosmic-ray soil moisture probe: Theory and Monte Carlo simulations. Water Resources Research 49, 3566-3575, doi: 10.1002/wrer.20187 (10 pgs).

Desilets et al., "Nature's neutron probe: Land surface hydrology at an elusive scale with cosmic rays", Water Resources Research, vol. 46, No. 11, Nov. 1, 2010, 7 pgs.

Dhairyawan et al., "Response Functions of Spherically Moderated Neutron Detectors", Nuclear Instruments and Methods, vol. 169, No. 1, Feb. 1980, pp. 115-120.

Fragopoulou et al. Shielding around spallation neutron sources, Journal of Physics: Conference Series vol. 41, pp. 514-581 (Year: 2006).

Heidbüchel et al., "Use of cosmic-ray neutron sensors for soil moisture monitoring in forests" Hydrol. Earth Syst. Sci., 20, 1269-1288, 2016.

"Insights into the footprint of the cosmic-ray probe from new field measurements and neutron modeling," COSMOS 5 Workshop, Copenhagen, Aug. 22-24, 2016 (63 pgs).

Knoll, G.F., 2000, Radiation detection and measurement: New York, Wiley, 802 p. (82 pgs), relevant pp. 55-57, 159-173 and 505-520.

Köhli, M., M. Schrön, M. Zreda, U. Schmidt, P. Dietrich, and S. Zacharias, 2015. Footprint characteristics revised for field-scale soil moisture monitoring with cosmic-ray neutrons. Water Resources Research 51, 5772-5790 (20 pgs).

Lab C Website, www.lab-c.co (7 pgs), dated Dec. 18, 2018.

Rees, et al., "Optimizing moderation of He-3 neutron detectors for shielded fission sources", Nuclear Instruments and Methods in Physics Research, vol. 691, Jul. 2012, pp. 72-80.

Schrön, M., M. Köhli, L. Scheiffele, J, Iwema, H.R. Bogena, L. Lv, E. Martini, G. Baroni, R. Rosolem, J. Weimar, J. Mai, M. Cuntz, C. Rebmann, S.E. Oswald, P. Dietrich, U. Schmidt, and S. Zacharias, 2017b. Improving calibration and validation of cosmic-ray neutron sensors in the light of spatial sensitivity. Hydrology and Earth System Sciences 21, 5009-5030 (22 pgs). Published Oct. 6, 2017.

Schrön, M., Zacharias, S., Womack, G., Köhli, M., Desilets, D., Oswald, S. E., Bumberger, J., Mollenhauer, H., Kögler, S., Remmler, P., Kasner, M., Denk, A., and Dietrich, P., 2017a. Intercomparison of Cosmic-Ray Neutron Sensors and Water Balance Monitoring in an Urban Environment, Geoscientific Instruments, Methods and Data Systems Discussions, https://doi.org/10,5194/gi-2017-34, in review (18 pgs). Published Mar. 9, 2018.

Schrön et al., "Monitoring Environmental Water with Ground Albedo Neutrons and Correction for Incoming Cosmic Rays with Neutron Monitor Data", Proceedings of Science, 34th International Cosmic Ray Conference, Jul. 30-Aug. 6, 2015, accessed by EP Examiner on Sept. 2, 2021 at: https://inspirehep.net/files/3062ae9eSe19a266535c5147bc2f3b5f, 8 pgs.

Stevanato et al., "Towards the optimization of a scintillator-based neutron detector for large non-invasive soil moisture estimation", IEEE International Workshop on Metrology for Agriculture and Forestry, Nov. 4, 2020, 5 pgs.

Yamashita, et al., "Detection Efficiency of Bare and Moderated BF3-Gas-Filled Proportional Counters for Isotropic Neutron Fluxes", Journal of Nuclear Science and Technology, vol. 3, No. 8, Aug. 1966, pp. 343-353.

Zreda, M., D. Desilets, T.P.A. Ferré, and R.L. Scott, 2008. Measuring soil moisture content non-invasively at intermediate spatial scale using cosmic-ray neutrons. Geophysical Research Letters 35, L21402, doi:10.1029/2008GL035655 (5 pgs).

Zreda, M., W.J. Shuttleworth, X. Zeng, C. Zweck, D. Desilets, T. Franz, and R. Rosolem, 2012. COSMOS; the COsmic-ray Soil Moisture Observing System, Hydrology and Earth System Sciences 16, 4079-4099 (23 pgs).

Zreda et al., "Cosmic-ray neutron probe: non-invasive measurement of soil water content", Dept. of Hydrology and Water Resources, Univ. of Arizona, undated, accessed by EP Examiner on Sep. 2, 2021 at: http://quebec.hwr.arizona.edu/resea ch/agu05-zreda-cosmic-ray-neutron-probe pdf, 1 pg.

(56)         References Cited

OTHER PUBLICATIONS

Zreda et al., "COSMOS: the COsmic-ray Soil Moisture Observing System", Hydrology and Earth System Sciences, vol. 16, Nov. 7, 2012, 21 pgs.

European Search Report issued in EP Application No. 18 885 680.1, dated Jul. 20, 2021, 14 pgs.

European Search Report issued in EP Application No. 18 887 019.0, dated Sep. 2, 2021, 13 pgs.

European Search Report issued in EP Application No. 21 209 958.4 dated Mar. 21, 2022, 10 pgs.

European Search Report issued in EP Application No. 18 885 680.1 dated May 17, 2022, 11 pgs.

European Search Report issued in EP Application No. 22 165 845.3 dated Jun. 22, 2022, 14 pgs.

European Search Report issued in EP Application No. 22 171 348.0 dated Aug. 16, 2022, 8 pgs.

International Preliminary Report on Patentability issued in PCT/US18/64548 dated Jun. 9, 2020 (8 pgs).

International Preliminary Report on Patentability issued in PCT/US18/64573 dated Jun. 9, 2020 (6 pgs).

International Search Report and Written Opinion issued in PCT/US2018/064548 dated Feb. 19, 2019, 11 pgs.

International Search Report and Written Opinion issued in PCT/US2018/064573 dated Feb. 14, 2019, 9 pgs.

International Search Report and Written Opinion issued in PCT/US21/54591 dated Nov. 30, 2021, 9 pgs.

Office Action issued in U.S. Appl. No. 16/213,812 dated Feb. 15, 2019. 20 pgs.

Office Action issued in U.S. Appl. No. 16/213,812 dated Aug. 16, 2019 (16 pgs).

Office Action issued in U.S. Appl. No. 16/213,741 dated Feb. 8, 2019, 9 pgs.

Office Action issued in U.S. Appl. No. 16/213,741 dated Mar. 7, 2019, 18 pgs.

Office Action issued in U.S. Appl. No. 16/213,741 dated Jul. 9, 2019, 22 pgs.

Office Action issued in U.S. Appl. No. 16/213,741 dated Jan. 14, 2020, 18 pgs.

Office Action issued in U.S. Appl. No. 16/213,741 dated Mar. 3, 2020, 11 pgs.

Notice of Allowance issued in U.S. Appl. No. 16/213,812, dated Oct. 8, 2019, 6 pages.

Notice of Allowance issued in U.S. Appl. No. 16/213,741, dated Jul. 20, 2020. 9 pages.

Notice of Allowance issued in U.S. Appl. No. 17/102,118, dated Oct. 13, 2021, 16 pgs.

Notice of Allowance issued in U.S. Appl. No. 17/307,827, dated Jun. 15, 2022, 19 pgs.

Woolf et al. "Measurement of secondary cosmic-ray neutrons near the geomagnetic North Pole", Journal of Environmental Radioactivity, 198, 2019., pp. 189-199, 11 pgs.

Supplementary European Search Report issued in EP Application No. 21880915.0, dated Sep. 20, 2024, 8 pgs.

U.S. Appl. No. 17/499,614, filed Oct. 12, 2021, Shifflett et.

U.S. Appl. No. 17/667,914, filed Feb. 9, 2022, Zreda et al.

* cited by examiner

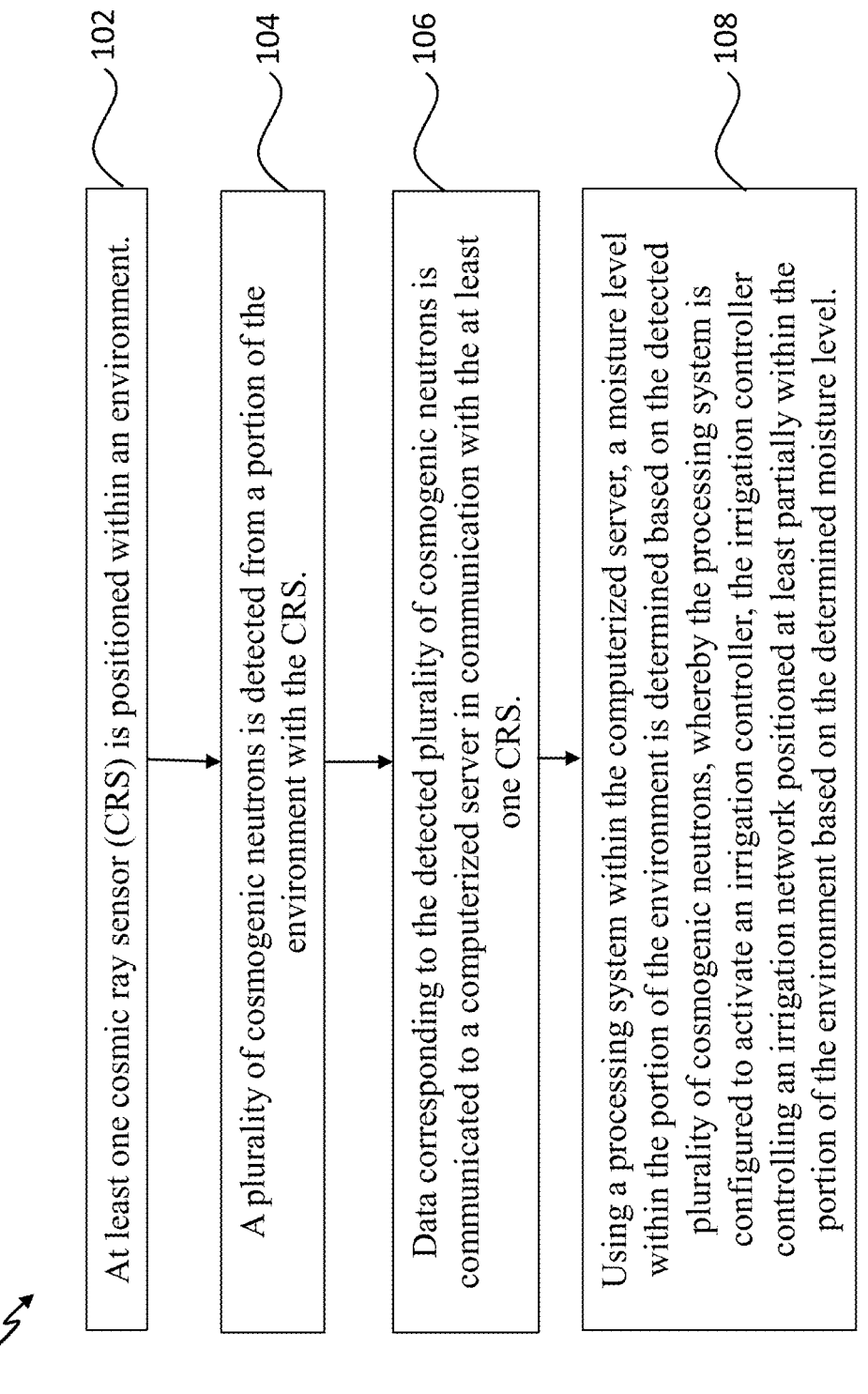

100

At least one cosmic ray sensor (CRS) is positioned within an environment. ⟋102

A plurality of cosmogenic neutrons is detected from a portion of the environment with the CRS. ⟋104

Data corresponding to the detected plurality of cosmogenic neutrons is communicated to a computerized server in communication with the at least one CRS. ⟋106

Using a processing system within the computerized server, a moisture level within the portion of the environment is determined based on the detected plurality of cosmogenic neutrons, whereby the processing system is configured to activate an irrigation controller, the irrigation controller controlling an irrigation network positioned at least partially within the portion of the environment based on the determined moisture level. ⟋108

FIG. 13

SYSTEMS AND METHODS OF COSMIC RAY SENSING OF SOIL MOISTURE FOR TURF GRASS AND CROP MANAGEMENT

CROSS REFERENCE TO RELATED APPLICATION

This application claims benefit of U.S. Provisional Application Ser. No. 63/271,626, entitled, "Cosmic Ray Sensing In Golf Course And Turf Grass Management" filed Oct. 25, 2021, the entire disclosure of which is incorporated herein by reference.

FIELD OF THE DISCLOSURE

The present disclosure is generally related to cosmic ray sensing and more particularly is related to cosmic ray sensing in golf course and turf grass management.

BACKGROUND OF THE DISCLOSURE

Measuring the moisture content of materials such as surface soils using cosmogenic neutron detection is known in the art. Cosmic rays continually bombard the Earth and penetrate into materials at the land surface, including soil, atmosphere, water, man-made structures, vegetation, and the like. Inside these materials, cosmogenic high-energy ($>10$ MeV) neutrons collide with matter and produce fast ($<2$ MeV) cosmogenic neutrons. These neutrons interact with matter in reactions called neutron scattering that lead to the gradual decrease of neutron energies and eventually to the removal of neutrons from the environment. Hydrogen is by far the most efficient element in scattering neutrons. Therefore, moisture content of the soil through which neutrons have traveled can be inferred from the measured neutron flux, which is inversely correlated with soil moisture content. This principle has been used to develop cosmogenic neutron soil moisture measuring systems and methods which are used around the world.

In recent times, cosmogenic neutron soil moisture measuring systems have been used in academic and government research fields to conduct experimentation with the detection of soil moisture in various locations for various purposes. While initial experiments have been conducted, these trials do not account for the shortcomings of these systems to provide practical and commercially viable soil moisture monitoring within industries which utilize turf grass settings and other, similar vegetative landscapes.

Thus, a heretofore unaddressed need exists in the industry to address the aforementioned deficiencies and inadequacies.

SUMMARY OF THE DISCLOSURE

Embodiments of the present disclosure provide a cosmic ray sensing soil moisture management system. Briefly described, in architecture, one embodiment of the system, among others, can be implemented as follows. At least one cosmic ray sensor (CRS) is positioned within an environment, wherein the CRS detects a plurality of cosmogenic neutrons from a portion of the environment. A computing platform is in communication with the at least one CRS, wherein data corresponding to the detected plurality of cosmogenic neutrons is communicated to the computing platform. A processing system is within the computing platform, wherein the processing system determines a moisture level within the portion of the environment based on the detected plurality of cosmogenic neutrons, wherein the processing system is configured to activate an irrigation controller, the irrigation controller controlling an irrigation network positioned at least partially within the portion of the environment based on the determined moisture level.

The present disclosure can also be viewed as providing a cosmic ray sensing soil moisture management method. In this regard, one embodiment of such a method, among others, can be broadly summarized by the following steps: positioning at least one cosmic ray sensor (CRS) within an environment; detecting a plurality of cosmogenic neutrons from a portion of the environment with the CRS; communicating data corresponding to the detected plurality of cosmogenic neutrons to a computing platform in communication with the at least one CRS; and using a processing system within the computing platform, determining a moisture level within the portion of the environment based on the detected plurality of cosmogenic neutrons, whereby the processing system is configured to activate an irrigation controller, the irrigation controller controlling an irrigation network positioned at least partially within the portion of the environment based on the determined moisture level.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 13 is a flowchart illustrating a method of cosmic ray sensing soil moisture management, in accordance with exemplary embodiments of the present disclosure.

DETAILED DESCRIPTION

Figure 1:
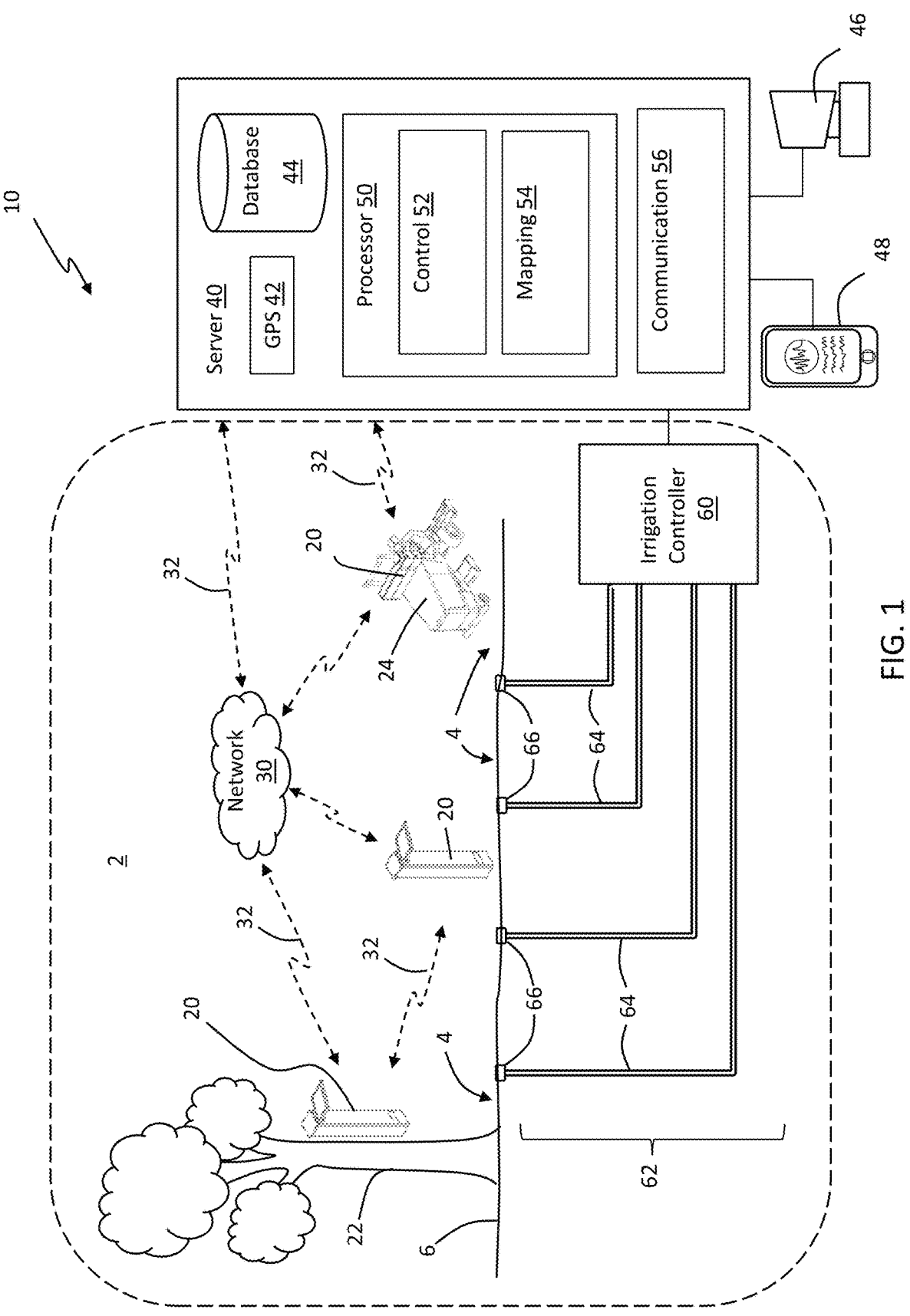
FIG. 1 is a diagrammatical illustration of a cosmic ray sensing soil moisture management system, in accordance with exemplary embodiments of the present disclosure.

The subject disclosure is directed to providing improvements over traditional soil moisture management techniques by providing a cosmic ray sensing management system and method which allow for increased accuracy, control, and implementation of soil moisture measurement and management. While the subject disclosure has a wide range of applications, it provides particular benefits to the soil moisture management of settings with turf grass, such as in golf courses, parks, athletic fields, and other, similar settings. For clarity in disclosure, the novel technologies described herein are described relative to use in turf grass management, and in particular, within a golf course, but it is noted that the subject disclosure can have applications to a variety of other agricultural crops, including but not limited to: corn, wheat, alfalfa, milo, beans, cabbage, carrots, peppers, and any similar crop, grain, or vegetable.

Turf grass in large fields, parks, and golf courses is a high value agricultural crop. In these environments, especially for golf courses, the quality of the turf grass must be high, and it must be maintained at a high level throughout all or most of the year. Proper irrigation is critical to maintaining turf grass, and knowledge of soil moisture is one of the most important inputs to an irrigation prescription or plan. Most conventional soil moisture measurement sensors are in situ, point sensors that are inserted into the ground and measure the soil moisture in a very small volume around the insertion site. These conventional sensors require physical contact between the sensor itself and the soil at or below the turf grass. Soil moisture is, generally, heterogenous, in that, the composition of soil can vary between different locations even within the same general vicinity. For instance, the soil in a golf course abutting a sand trap may vary in composition from the soil abutting a body of water. Therefore, a large number of these conventional point sensors are needed in a large field or golf course in order to gain an accurate measurement of an average soil moisture value over the field or course as a whole.

Additionally, each of these conventional point sensors commonly requires a wired connection to a central controller or computer which compiles the data sensed by each sensor. As such, the use of conventional point sensors often results in a very large network of subterranean wires. This wired network can be difficult to initially install, simply due to the extent of trenching and other excavation required, and subterranean sensor wires can also be subject to failure over longer periods of time, such as from environmental degradation, damage from physical objects, or exposed connection points which interfere with the transmission of signals. Wireless networks of point sensors have also been used, but these have their own complexities, such as data collection, management of point sensor power, and the need to remove or relocate these in-situ point sensors for field or turf management, and/or when maintenance of the irrigation system is required.

Irrigation systems for turf grass, especially at golf courses, can be very sophisticated. Typical irrigation systems utilize a large network of pipes, valves, manifolds, and other fluid control structures, many of which are installed below the ground or in locations where they do not interfere with play on the golf course. These irrigation systems can be controlled with timed controllers which blindly open valves to release irrigation water according to a schedule. More recently, irrigation systems may be controlled with a web-based control system which communicates with each individual sprinkler head throughout the golf course. A typical 18 hole golf course can have around 1600 individually controlled sprinkler heads. Utilizing conventional moisture point sensors for each of the 1600 sprinkler heads can be impractical, so it is often the case that an irrigation system will utilize a single sensor which is located proximate to a number of sprinkler heads. As such, the level of irrigation control is often far better than the data about the soil moisture throughout the golf course. This results in imprecise soil moisture data. Imprecise data, in turn, leads to improper irrigation control, e.g., overwatering and underwatering, which wastes water and leaves turf grass with inconsistent hydration, thus leading to overwatered areas and underwatered areas.

The subject disclosure provides the ability to utilize soil moisture sensing wirelessly using CRSs which can provide data to generate a soil moisture map of high, medium or even low resolution, which can be used by the irrigation system to irrigate more effectively. In particular, the technology described herein can allow users to make better use of a sophisticated irrigation system, e.g., with individual sprinkler head control, to provide a high level of individual control over irrigated sub-regions of a golf course or other large setting.

FIG. 1 is a diagrammatical illustration of a cosmic ray sensing soil moisture management system 10, in accordance with exemplary embodiments of the present disclosure. The cosmic ray sensing soil moisture management system 10, which may be referred to herein as 'system 10' includes at least one cosmic ray sensor (CRS) 20 positioned within an environment 2, wherein the CRS 20 detects a plurality of cosmogenic neutrons from at least a portion 4 of the environment 2, such as a smaller area within the total environment 2. As shown in FIG. 1, a plurality of CRSs 20 may be used in various positions and configurations, such as for instance, in an elevated position mounted to an object 22, such as a tree, positioned on or near the ground surface 6, or positioned on a mobile vehicle 24.

The CRSs 20 are in communication with a computing platform 40, such as a computer, physical server, a cloud server, or another computing device, such that data corresponding to the detected plurality of cosmogenic neutrons from each CRS 20 is communicated to the computing platform 40. The communication of this data may occur through a network 30 which is in communication with the server 40. In the example shown in FIG. 1, communication signals 32 can be communicated from a CRS 20 to the wireless network 30, between two or more CRS 20 units, or directly from a CRS 20 to the server 40, or along another path. It is noted that any network or medium of communication may be used, including wired, wireless, direct point, remote, including, but not limited to, satellites, cellular, Wi-Fi, radio, Bluetooth, infrared, NFC, RFID, LAN, WAN, the Internet, a cloud network, or others, all of which are considered within the scope of the present disclosure.

It is further noted that the functionality of the computing platform 40 may reside within a CRS 20 itself, such that the processing and interfacing between the server 40 and an irrigation controller 60, or another device, can be completed within the CRS 20 itself. For instance, the calculations and any corrections to the sensed or detected data, or the processing thereof, can be done within the hardware and software of the CRS 20. In this design, the irrigation control 60 would not necessarily need the data processing to be completed on a separate computing platform 40, but rather, the computing platform 40 could be incorporated in the CRS 20 itself. Any combination of processing data or controlling the irrigation controller 60 from a remote computing platform 40 or a local computing platform 40, e.g., internal of the CRS 20, is possible, all such possibilities are considered within the scope of the present disclosure.

The system 10 may use stationary CRS 20 units to measure wide area or localized soil moisture data. The wide area measurement may occur over a large portion 4 of the environment 2, such as an area with a width or diameter of many meters or hundreds of meters. In contrast, a localized soil moisture measurement may utilize high spatial resolution, which detects data on a smaller location, such as a portion 4 of the environment 2 which is only a few meters to tens of meters wide or in diameters. The specific ability of a CRS 20 to detect wide area or localized data may depend on the design of moderator and neutron shield, as is known in the art and discussed further relative to FIGS. 6A-6C.

A processing system 50 is implemented within the computing platform 40. In general terms, the processing system 50 determines a moisture level within the portion 4 of the environment 2 based on the detected plurality of cosmogenic neutrons from the CRS 20. With the data on the moisture level, the processing system 50 may be capable of activating, stopping, or otherwise controlling an irrigation controller 60 which controls the irrigation system 62 within the environment 2. For instance, the irrigation controller 60 may control the flow of water through a network of pipes 64 which are attached to sprinkler heads 66 or other irrigation outputs, such as flood irrigation devices, drip irrigation devices, or any other type of irrigation device. The processing system 50 may activate the irrigation controller 60 (or provide instructions or a recommendation to activate the irrigation controller 60) in order to control the irrigation activity at any of the sprinkler heads 66, and more particularly, to control the irrigation activity at a particular sprinkler head 66 which corresponds in location to the portion 4 of the environment 2 from which the cosmogenic neutron detection occurred by a CRS 20. In this way, the use of the CRS 20 and the cosmogenic neutron data sensed by a CRS 20 in a particular location within the environment 2 can be used to provide geographically pinpointed and dynamic control of irrigation in that location, such that each portion 4 of the environment 2 can receive the most appropriate level of irrigation possible.

It is noted that the detected count, also known as the flux, rates of cosmogenic neutrons may be processed and corrected for local environmental corrections. These corrections can be applied within the CRS 20 instrument itself, or applied elsewhere. As the corrected detected cosmogenic neutron count (flux) rates correspond to a soil moisture level, it is possible to utilize a neutron to soil moisture "look-up" table to determine soil moisture. Irrigation controller 60 operation may be made based on the rate of locally corrected cosmogenic neutrons. Thus, it is possible for direct control of irrigation to be accomplished via use of corrected cosmogenic neutron count rates (flux).

Detected count (flux) rates of cosmogenic neutrons are processed and corrected for local environmental corrections. These corrections can be applied within the CRS instrument itself. As the corrected detected cosmogenic neutron count (flux) rates correspond to a soil moisture level, it is possible to utilize a neutron to soil moisture "look-up" table to determine soil moisture. Irrigation control decisions may be made based on the rate of locally corrected cosmogenic neutrons. Thus, direct control of irrigation could be accomplished via use of corrected cosmogenic neutron count rates (flux).

The computing platform 40 may include any number of features which are used in computer processing and architecture, including a GPS module 42 which configures GPS data from CRS 20 units and a database 44 which stores data including historical data of CRS 20 detections. The server 40 may also be in communication with a user portal 46 which can display real-time data from all CRS 20 units installed throughout the environment 2. Additionally, the server 40 may have capabilities to communicate with, or be accessed by, a computing device 48 such as a mobile computing device which allows for users to access the system 10 data from any location, or to control the system 10 from any location. For example, the user portal 46 may display moisture data and maps on a local computer or on a website, or data may be sent out to user computing devices 48 or smart phones automatically. System diagnostic information and alerts may be sent out automatically to a user portal 46 or user computing devices 48, as the case may be. The processing system 50 on the server 40 may include various modules or operation functions, such as for control 52, for mapping 54, or for others. Additionally, a communication module 56 with any type of input/output device may be included in the server 40, as depicted in FIG. 1.

Further descriptions and details of the system 10 are provided relative to FIGS. 2-12.

Figure 2:
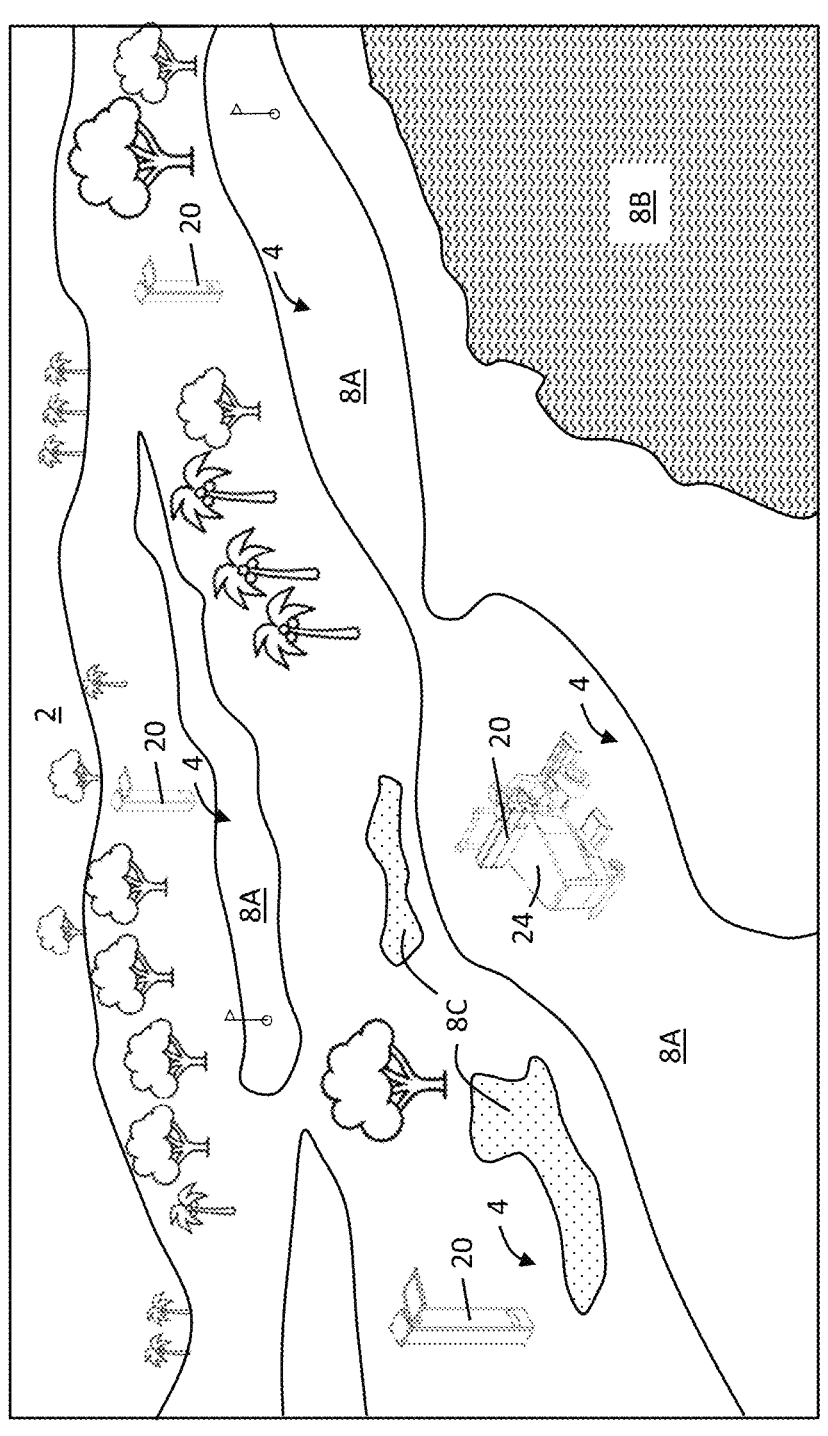
FIG. 2 is a diagrammatical illustration of a cosmic ray sensing soil moisture management system in a golf course, in accordance with exemplary embodiments of the present disclosure.

FIG. 2 is a diagrammatical illustration of a cosmic ray sensing soil moisture management system 10 in a golf course, in accordance with exemplary embodiments of the present disclosure. As shown, in FIG. 2 the environment 2 is depicted as a golf course having various sections common on a golf course, such as fairways 8A, a water feature 8B, sand traps 8C, etc., where the CRS 20 units can be positioned at various locations around the environment 2. For instance, one or more CRS 20 units may be positioned near each of the fairways 8A or along other parts of the environment 2 where irrigation control is desired. The portion 4 of the environment 2 that the CRS 20 senses cosmogenic neutrons may have various sizes which may be based on the type of CRS 20 used, the position or configuration of the CRS 20, or other factors. It may be possible to have some CRS 20 units positioned in substantially stationary locations, such as positioned on the ground surface or mounted in elevated positions to trees or other structures. It may also be possible to utilize a CRS 20 which is mounted to a mobile vehicle 24 which can move around the environment 2, such that the mobile vehicle 24 carries the CRS 20 around various parts of the environment 2 to sense cosmogenic neutrons in those locations.

Figure 3:
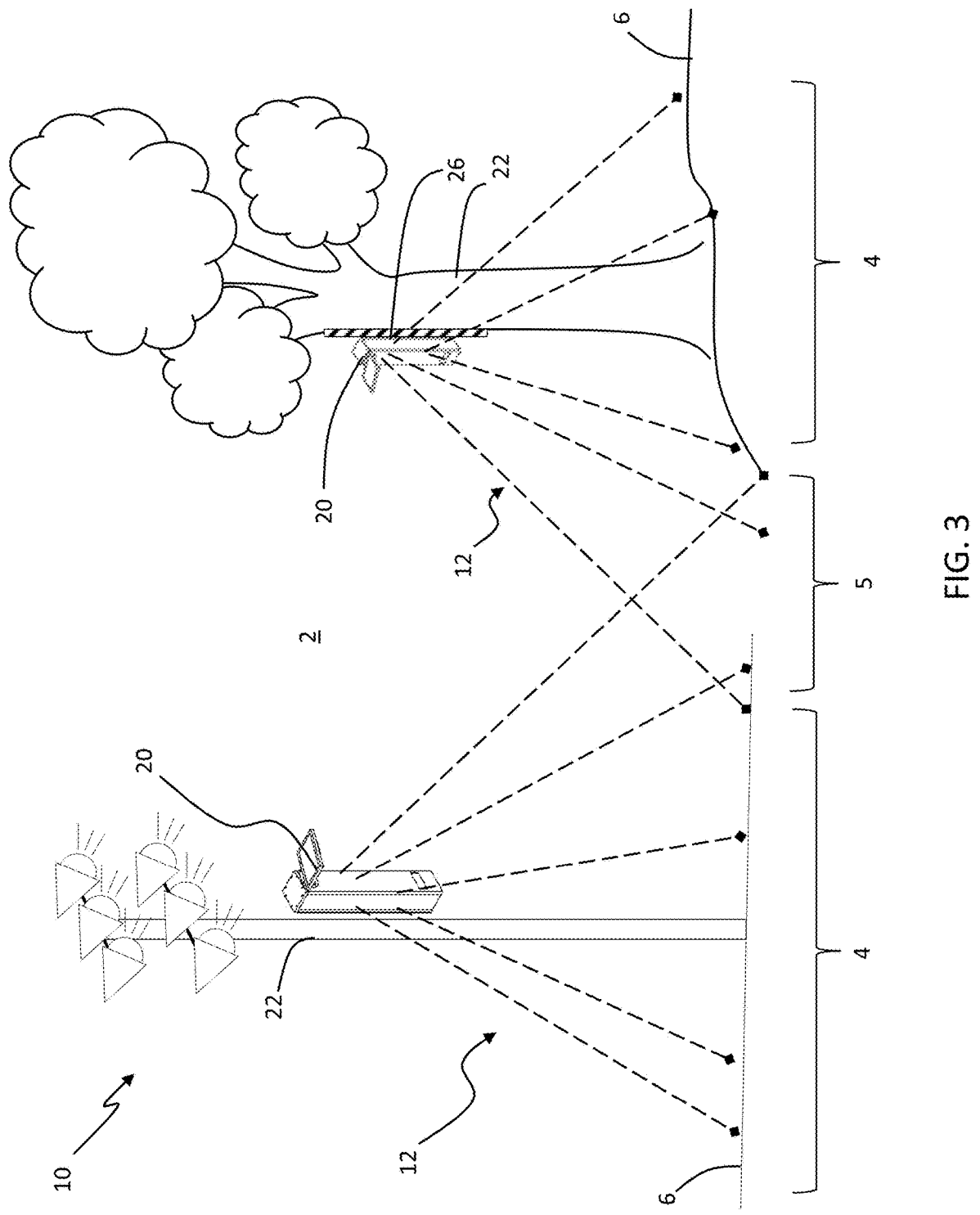
FIG. 3 is a diagrammatical illustration of a cosmic ray sensor (CRS) mounting locations in cosmic ray sensing soil moisture management system, in accordance with exemplary embodiments of the present disclosure.

FIG. 3 is a diagrammatical illustration of a CRS 20 in various mounting locations in cosmic ray sensing soil moisture management system 20, in accordance with exemplary embodiments of the present disclosure. In particular, FIG. 3 depicts CRS 20 units mounted on various structures 22, such as a light pole on the left side of the figure, and a tree on the right side of the figure. In both examples, the CRS 20 may be mounted in an elevated position where there is a spaced distance between the CRS 20 and the ground surface 6. The specific height that the CRS 20 is mounted may vary depending on the design and intended use of the system 10. For instance, it may be possible to mount the CRS 20 a few meters or less off the ground surface 6, or it may be possible to mount the CRS 20 many meters above the ground surface 6, or any other position.

The use of a CRS 20 mounted in a stationary position or substantially stationary position, e.g., where the position of the CRS 20 is intended to be fully stationary but the actual position may vary slightly based on inadvertent movement of a tree or light pole within the wind, may allow for continuously monitoring average soil moisture over a portion 4 of the environment. In many situations, the elevated height of a CRS 20 will allow it to sense a wide area of the environment 2, since due to the height, the CRS 20 will have a larger sensing or measurement footprint.

It is noted that multiple stationary CRSs 20 can be installed and communicate wirelessly or through wired connections, as described relative to FIG. 1. When multiple stationary CRSs 20 are used, which may often be the case, the CRSs 20 may be positioned to be spread out to cover a significant fraction of the environment 2, such that they can detect moisture in a larger area of the golf course or other setting they're positioned in. Each CRS 20 unit may have a measurement footprint, which may be understood as the part of the environment 2 below the CRS 20 from which cosmogenic neutrons 12 can be detected. For instance, in FIG. 3, the measurement footprint of the CRS 20 mounted to the light pole may generally correspond to the portion 4 of the environment 2 directly below and laterally below the CRS 20, e.g., the portion 4 on the left side, where the measurement footprint of the CRS 20 mounted to the tree may generally correspond to the portion 4 of the environment 2 directly below and laterally below the CRS 20, e.g., the portion 4 on the right side. The CRSs 20 may be positioned separated from one another such that they don't overlap, or they may be positioned such that an overlapping portion 5 is created, whereby two or more CRSs 20 detect cosmogenic neutrons 12 from a single location. In this situation, the CRSs 20 may have overlapping measurement footprints.

Stationary CRS 20 units can be attached to any object, such as, but not limited to, a dedicated pole, an existing utility, a sign pole, or to physical structures like shade covers, or trees and bushes, among any other type of structure. Since many golf courses have trees in key areas, such as in or along the sides of fairways 8A (FIG. 2), mounting a CRS 20 unit to a tree may be particularly efficient and non-disruptive to the setting, both in terms of not impeding the game and not detracting from the aesthetic appearance of the environment 2. The tree may also serve as camouflage for the CRS 20 to make it less conspicuous.

In situations where a CRS 20 is mounted to a structure which has a moisture content itself, such as a tree which has internal moisture, it may be possible to utilize a neutron shield 26 in a position between the tree and the CRS 20 to reduce the sensitivity of the CRS 20 to fluctuations of water within the trunk of the tree. The neutron shield 26 may be formed from a plastic material of appropriate thickness, as is known in the art. Placing the shield 26 between the CRS 20 and tree to block signal coming from the tree may reduce sensitivity of the CRS 20 to water moving through the tree trunk and branches.

It is noted that the stationary CRS 20 may be a standard CRS 20 or high spatial resolution CRS 20 by choice of design. The CRS 20 may have internal data logging and wireless communications to send data (back-and-forth) to the central server 40, whether positioned on site in or near the environment 2, or positioned in the cloud. Computations for determining soil moisture from the detected cosmogenic neutrons, which are well known in the art, may be performed on the CRS 20 itself, or in the server 40, in both the CRS 20 and the server 40, or in another location.

Figures 4A, 4B:
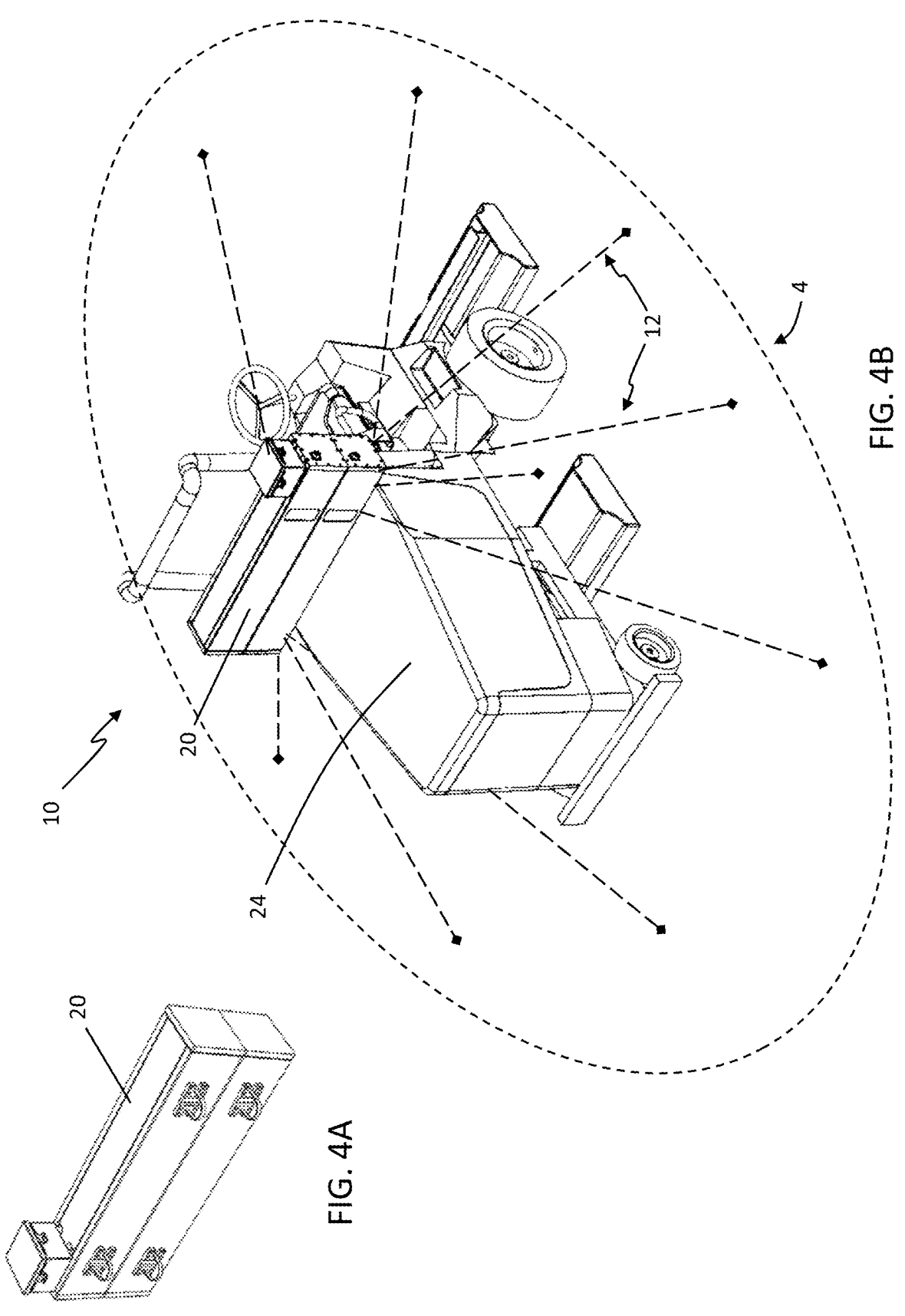
FIGS. 4A-4B are diagrammatical illustrations of a CRS and a CRS in a mobile mounting location in cosmic ray sensing soil moisture management system, in accordance with exemplary embodiments of the present disclosure.

FIG. 4A is a non-scale, diagrammatical illustration of a CRS 20 in an unmounted and uncarried configuration, e.g., where the CRS 20 is provided alone. FIG. 4B illustrates the CRS 20 positioned in a mobile mounting location in cosmic ray sensing soil moisture management system 10, in accordance with exemplary embodiments of the present disclosure. As shown in FIG. 4B, the CRS 20 unit is carried by the mobile vehicle 24, which is depicted as a ride on mower or turf grass conditioner. In this example, as the mobile vehicle 24 is moving around a golf course, such as to mow or condition the grass, it may carry the CRS 20 unit which can detect cosmogenic neutrons in order to determine the corresponding soil moisture level. This data can then be used to make a higher resolution soil moisture map of the turf grass in the golf course, either later in time or in real time as the mobile vehicle 24 is moving. The use of a mower or conditioner to carry the CRS 20 may allow the system 10 to operate with efficiency and convenience, since soil moisture measurements can be made without a separate vehicle or trip around the golf course. Placement of a CRS 20 on vehicles that already travel substantial portions of a turf area are especially efficient since they do not require additional labor to drive the CRS 20 over the turf. On a golf course, golf carts, groundskeeping vehicles and lawn mowers already drive over substantial portions of turf and are good options for attaching a CRS 20 to make it mobile.

The CRS 20 may be designed to easily attach to various mobile platforms from lawn mowers to golf carts to UTVs and trailers. The position of mounting of the CRS 20 may depend on the type of mobile vehicle 24 and the intended use of the CRS 20. For instance, it may be possible to mount the CRS 20 to the top of the mobile vehicle 24, as shown in FIG. 4B, or it may be possible to mount the CRS 20 closer to the ground surface, such as along a front or rear bumper of the mobile vehicle 24. It may also be possible to utilize a frame or mounting structure which allows the CRS 20 to be carried at the desired position, and may also allow the CRS 20 to have an adjustable position, as discussed further relative to FIGS. 5A-5B. The mobile vehicle 24 may operate with a human operator, autonomously without a human driver, or semi-autonomously without a human driver, e.g., where there is human control from a remote location. For instance, in one example, the mobile vehicle 24 may be fully autonomous and move along a pre-programmed path within the environment, or move along a self-determinative path.

The CRS 20, when mobile, may be configured in standard CRS mode, extended wide-area CRS mode or high spatial resolution mode, such that the portion 4 of the environment (FIGS. 1-2) is generally a larger area on the order of 10 to 100+ meters in diameter. In FIG. 4B, the portion 4 is depicted as a circular location around the CRS 20, whereby cosmogenic neutrons 12 are detected from this location. As the mobile vehicle 24 moves, the portion 4 changes to correspond with the vehicle movement. In order to capture cosmogenic data in the system 10, the CRS 20 may take sensor readings or measurements at various times, such as continually or at predetermine time intervals. It may also be possible for the CRS 20 to take sensor readings or measurements based on a location of the mobile vehicle 24, such as where the mobile vehicle 24 includes a GPS device which tracks its location. In this situation, the system 10 can be configured to limit duplicate sensor measurements in situations where the mobile vehicle 24 stops or slows down. Capturing cosmogenic neutron measurements in accordance with any other parameter, or a combination of parameters, such as time and location, may also be used.

When a CRS 20 is carried on a mobile vehicle 24, it may be designed to have optimal operation despite the various force that it may be subjected to, such as vibrations, braking or acceleration forces, hole or dips in the ground surface, objects that the mobile vehicle 24 drives over, or others. The CRS 20 may include layers of vibration damping material between all critical components, namely the gas detectors and electronics, which may protect them from these forces. Additionally, the CRS 20, whether mobile or stationary, may be housed in a structure or compartment which ensures it will not suffer environmental degradation, such as from inclement weather, UV rays, elevated temperatures, or others.

It is noted that a mobile-carried CRS 20 may communicate data wirelessly through a range of modalities, as described relative to FIG. 1. It may also store data locally for direct retrieval by a technician. Storage of data may be on any acceptable medium, such as a SD card or similar storage media. A soil moisture map, as discussed in greater detail relative to FIGS. 9-12, may be created in the CRS 20 hardware or in the central server 40, or in the cloud, or in another location or combinations of locations.

Figures 5A, 5B:
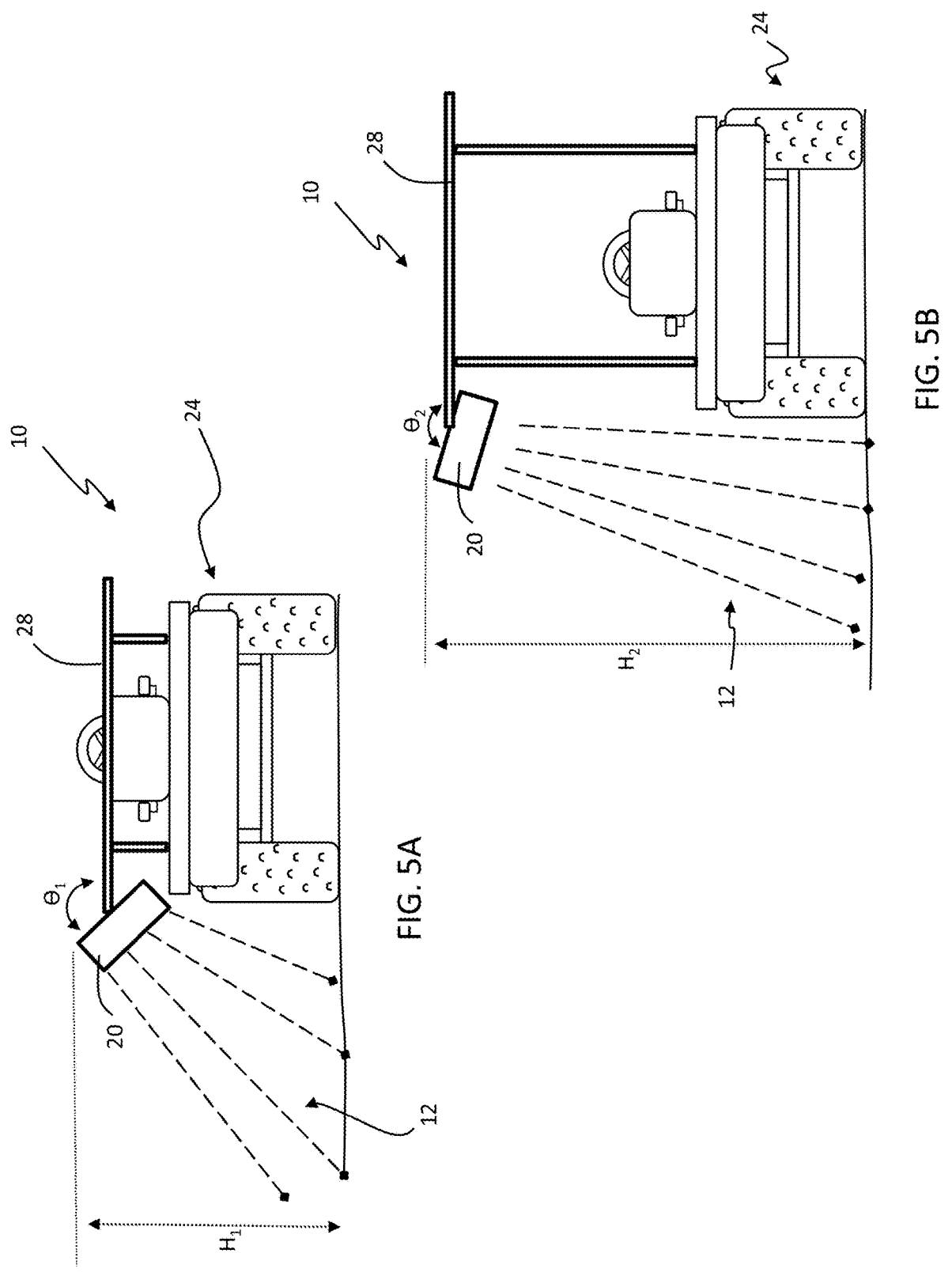
FIGS. 5A-5B are diagrammatical illustrations of CRS mounting configurations in a cosmic ray sensing soil moisture management system, in accordance with exemplary embodiments of the present disclosure.

FIGS. 5A-5B are diagrammatical illustrations of CRS mounting configurations in cosmic ray sensing soil moisture management system 10, in accordance with exemplary embodiments of the present disclosure. As shown in FIGS. 5A-5B, the CRS 20 may be mounted to a frame 28 which is also carried by the mobile vehicle 24, where the frame 28 is movable in various directions or positions. For instance, the frame 28 may be movable or adjustable in a vertical direction to increase a height or vertical position of the CRS 20, for instance, from $H_1$ as shown in FIG. 5A to $H_2$ as shown in FIG. 5B. Similarly, the frame 28 may allow for adjustability of an angular tilt of the CRS 20, whereby an angle of measurement of the CRS 20 can be moved between various angles, generally between 90° and 0° of a horizon. For instance, in FIG. 5A, the CRS 20 has an angular tilt of $\theta_1$ which creates a measurement footprint of cosmogenic neutrons 12 which extend laterally from the mobile vehicle 24, whereas in FIG. 5B, the CRS 20 has an angular tilt of $\theta_2$ which is different from $\theta_1$, and results in a measurement footprint of cosmogenic neutrons 12 which extend laterally from the mobile vehicle 24 but less so than in FIG. 5A.

Other movements and adjustability of the CRS 20 are also possible, such as angular tilts from a front to back direction, lateral movement of the CRS 20 across the frame 28, or movements of the CRS 20 relative to the mobile vehicle 24 itself, all of which are considered within the scope of the present disclosure. The specific mechanical components used in the frame 28 may vary, but may often include various brackets, frame bars, fasteners, actuators, servo motors, telescoping structures, or similar mechanical or electromechanical devices.

Figures 6A, 6B, 6C:
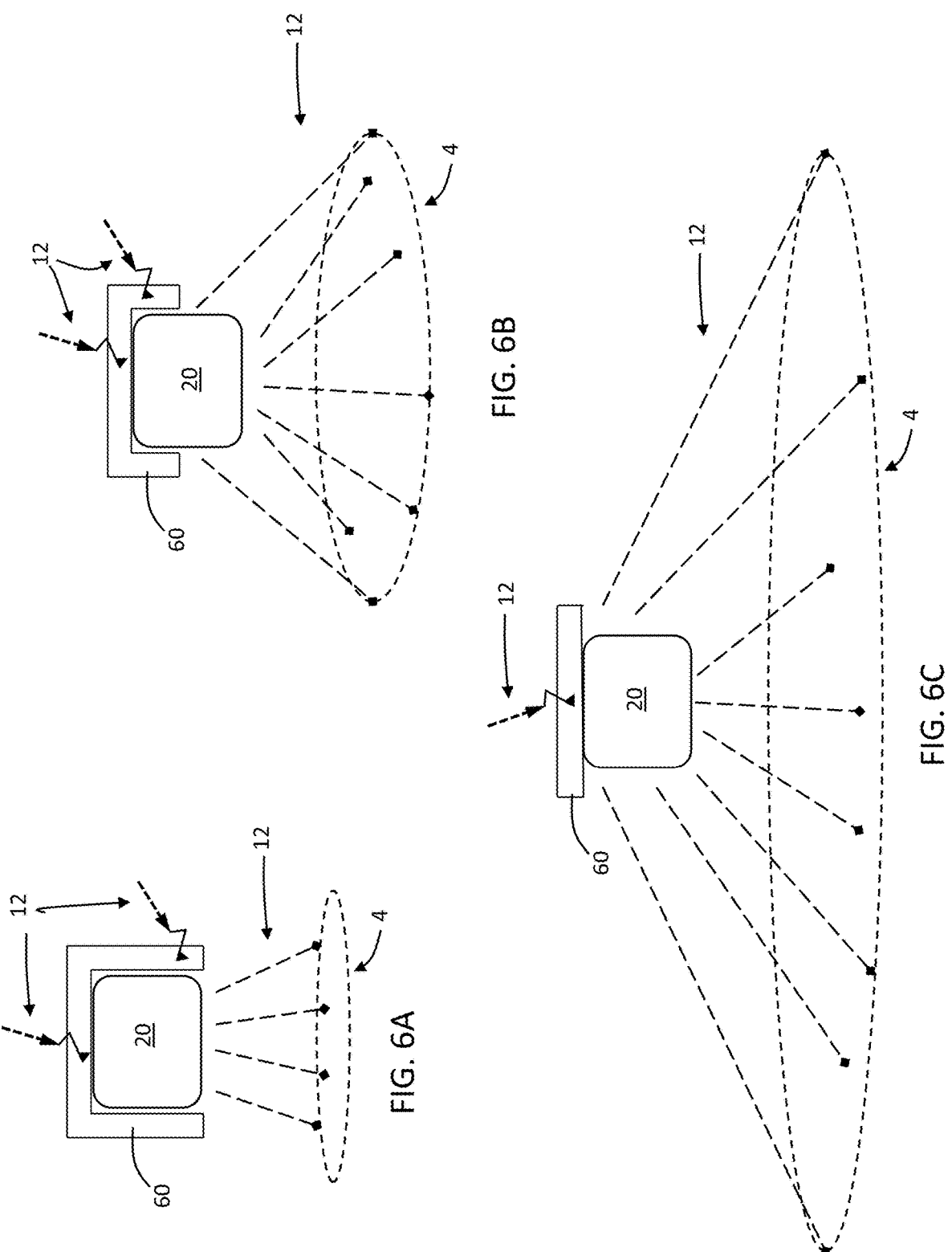
FIGS. 6A-6C are diagrammatical illustrations of various CRS used in a cosmic ray sensing soil moisture management system, in accordance with exemplary embodiments of the present disclosure.

FIGS. 6A-6C are diagrammatical illustrations of various CRS 20 units used in a cosmic ray sensing soil moisture management system 10, in accordance with exemplary embodiments of the present disclosure. In particular, FIGS. 6A-6C depict various types of CRS 20 units based on the use of neutron shields 60. For example, in FIG. 6A, a CRS 20 is depicted having a neutron shield 60 which is understood to be a local-area CRS 20 where the neutron shield 60 is positioned on the top surface of the CRS 20 and on an entirety of the lateral sides of the CRS 20. In this position, the neutron shield blocks neutrons 12 arriving from the top and lateral of the CRS 20 from being detected by the CRS 20, but allows neutrons 12 under the CRS 20 to be detected. In FIG. 6B, a CRS 20 is depicted having a neutron shield 60 which is understood to be an intermediate-area CRS 20 where the neutron shield 60 is positioned on the top surface of the CRS 20 and on a portion of the lateral sides of the CRS 20. In this position, the neutron shield blocks neutrons 12 arriving from the top of the CRS 20 and from a part of the lateral sides of the CRS 20 from being detected by the CRS 20, but allows neutrons 12 under the CRS 20 and from a portion of the lateral sides to be detected.

Further, in FIG. 6C, a CRS 20 is depicted having a neutron shield 60 which is understood to be a wide-area CRS 20 where the neutron shield 60 is positioned only on the top surface of the CRS 20. In this position, the neutron shield blocks neutrons 12 arriving from the top of the CRS 20, but allows neutrons 12 under the CRS 20 and from the entirety of the lateral sides to be detected. Similarly, while not depicted, it is possible to have a wide-area CRS 20 with a neutron shield 60 position only on the top surface of the CRS 20 and immediately below the bottom surface of the CRS 20. In comparison of FIGS. 6A-6C, the use of the different neutron shied 60 locations allows for a much smaller measurement footprint for the local-area CRS 20 in FIG. 6A than that of the wide-area CRS 20 of FIC 6C, such that the portion 4 of the environment 2 (FIGS. 1-2) that the CRS 20 is located in can vary substantially. This can be used to focus the radial sensitivity function of the CRS 20, which effectively allows the CRS 20 to be sensitive to only the measurement area which is desired.

It is further noted that it is also possible to use neutron shielding 60 to provide a laterally-directional CRS 20, such as where a neutron shield is positioned on the top surface of the CRS 20 and only on one lateral side of the CRS 20, which allows for laterally-directional sensitivity of the CRS 20. Thus, the CRS 20 may have a neutron shield 60 on any of its sides to block signal (neutron) flux from some directions and allow it from others. This creates lateral sensitivity in the CRS 20, and is discussed further relative to FIG. 7.

It is noted that regardless of the shielding 60 used or the position or configuration of the CRS 20, the CRS 20 is a non-contacting device which does not need a physical contact with the ground surface to determine soil moisture thereof. In many situations, the system 10 may implement a number of CRS 20 units wide-area averaging sensors that automatically averages over soil moisture heterogeneities at the land surface in a large circle corresponding to a measurement footprint, often on the order of a few hundred meters. In this configuration, the CRS 20 may be referred to as a Standard CRS 20. The CRS 20 can be modified to have a smaller measurement area, such as is shown with the local-area or intermediate-area depictions of FIGS. 6A-6B. In that mode, the CRS 20 is referred to as a high spatial resolution CRS 20. Both standard and high spatial resolution CRS 20 units have value in soil moisture measurement of turf grass in both stationary and mobile applications.

Stationary standard CRS 20 units generally have a large footprint and provide information useful in planning irrigation on a broad physical scale consistent with the measurement footprint of the device. High spatial resolution CRS 20 units provide information useful in planning irrigation on smaller spatial scales, down to the level of meters. Increasing spatial resolution of a CRS 20 can be achieved, in one example, by use of an appropriate neutron shield. This can be applied to both stationary and mobile CRS 20. Increasing spatial resolution can also be achieved by moving a standard CRS 20 through a field and using analysis techniques to infer higher spatial resolution data than the native resolution of the standard CRS 20. A mobile CRS 20 may have high spatial resolution due to both hardware modifications (of the neutron shield) and analysis of the mobile data.

A standard CRS 20 in stationary or mobile application modes can be modified, using a properly designed neutron shield 60, to decrease their sensitivity in undesired directions. For example, for a CRS 20 mounted on the edge of a golf course fairway, it may be desirable for its sensitivity to be high in the direction of the fairway and not in other directions. A neutron shield 60 on the side or sides of the CRS 20 which do not face the fairway can block neutron flux from those directions and decrease the sensitivity of the CRS 20 to moisture in soil in those unwanted directions. Reducing signal from unwanted directions increases the sensitivity (and signal contrast) of the CRS 20 to the soil to be measured in the desired direction—in this case the fairway. This concept of directional sensitivity of a CRS 20 in specific directions lateral to the land surface can be applied not just with local, smaller situations, such as to block a water feature in a golf course, but also in wider applications for monitoring natural, hydrogeological regions including, but not limited to, deserts to forests to mountains. It can also be used in other man made, commercial settings such as irrigated fields of crops. It can be used in stationary or mobile modes of operation.

For example, a CRS 20 can be mounted on a moving irrigation platform such as a center pivot irrigator. One or more CRS 20 can be modified to be sensitive to directions in front of or behind or directly below the moving irrigation platform. Regions in front of the moving platform have not been irrigated recently and will be drier in general, while regions behind and directly below the moving platform will be wetter. The ability to have one or more CRS 20 units with sensitivity in front of, directly below and behind the moving irrigation platform provides more information about the distribution of soil moisture normal to the direction of motion than standard CRS 20 units by themselves. Both standard and laterally directional CRS 20 can be used together on moving irrigation platforms to provide different kinds of useful information.

Figure 7:
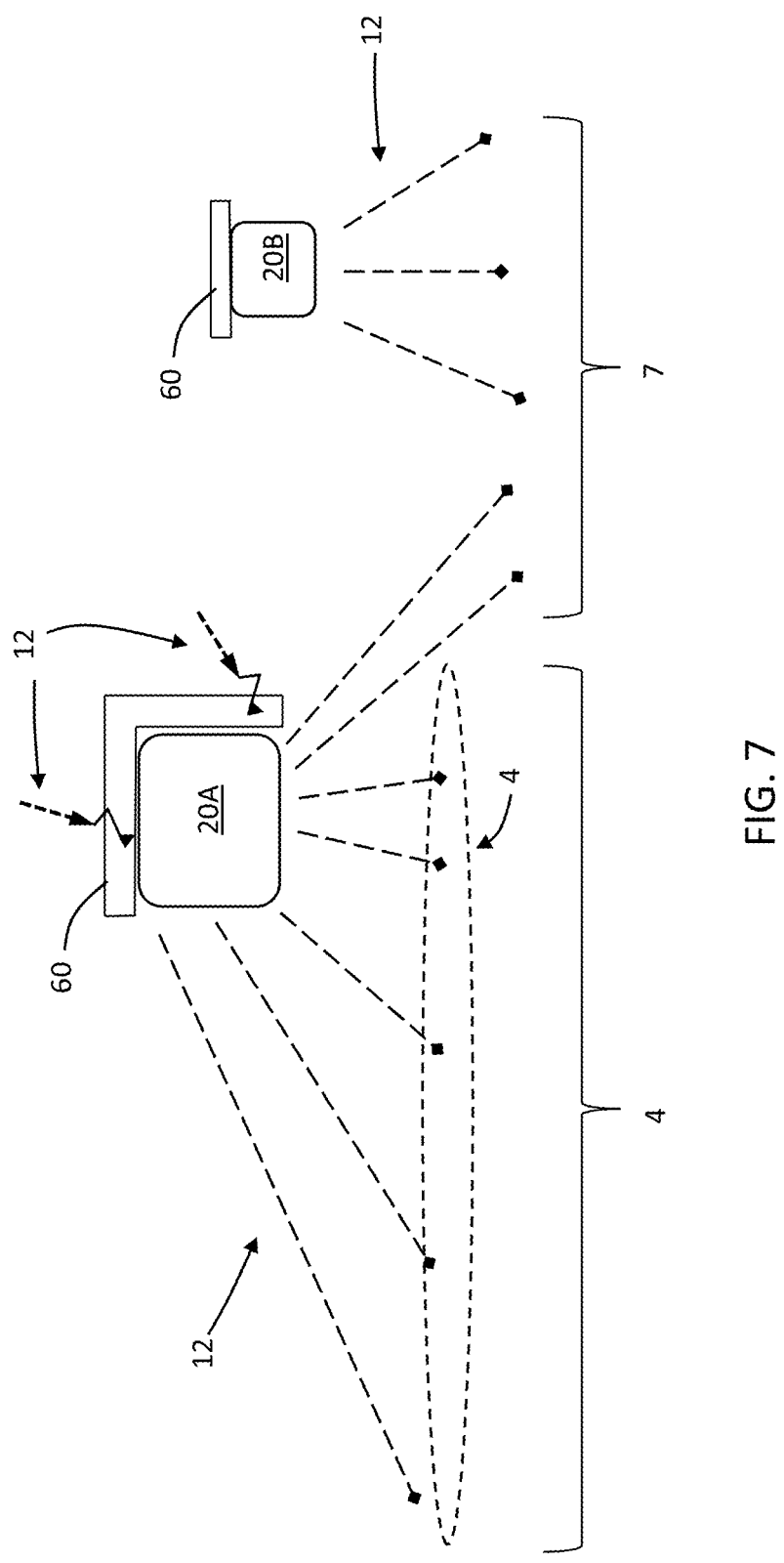
FIG. 7 is a diagrammatical illustration of a CRS configuration used in a cosmic ray sensing soil moisture management system, in accordance with exemplary embodiments of the present disclosure.

FIG. 7 is diagrammatical illustration of a CRS configuration used in a cosmic ray sensing soil moisture management system 10, in accordance with exemplary embodiments of the present disclosure, which provides an illustration of lateral directionality of a CRS 20. As shown, a first CRS 20A may be positioned in a portion 4 of the environment, and detect cosmogenic neutrons 12 within that portion 4. The use of neutron shielding 60 on the top and the right lateral side of the CRS 20A prevents neutrons 12 traveling from these directions from being detected by the CRS 20A, while the absence of neutron shields 60 on the left lateral side and bottom of the CRS 20A allows it to detect neutrons 12 which originate from these directions. In this configuration, the first CRS 20A is blocked from being sensitive to neutrons 12 on the top or right sides, thereby allowing it to focus on neutron detection from the bottom and left side.

In some cases, there are irrigated regions of interest which are adjacent to, sometimes surrounded by, non-irrigated 'background' regions. In FIG. 7, the irrigated region of interest is the portion 4 which corresponds to the first CRS 20A, while the background region 7 is separate from the portion 4. It is beneficial for the system 10 to properly measure soil moisture in irrigated regions of interest and use that information to efficiently irrigate them. The background regions, generally, are a source of noise in the CRS 20A if signal from these background regions is measured by the CRS 20A. The soil moisture signal in the background region, in general, will change differently from the irrigated region of interest. Background soil moisture will vary with rainfall, temperature, humidity, evapotranspiration and other factors.

One way of removing unwanted background noise is to place the CRS 20A instrument in the middle of the region of interest, e.g., portion 4 of the environment, such that it is only sensitive to soil moisture in the region of interest. It is also possible to use appropriate neutron shields 60 to limit the sensitivity of a CRS 20A to neutrons from a background region. However, in some cases, the measurement footprint (radially sensitivity function) of a standard cosmic ray sensing instrument may be larger than the region of interest. For instance, in FIG. 7 a portion of the neutrons 12 detected by first CRS 20A are originating from background region 7. When this occurs, it means some unwanted signal noise from the background region 7 will be detected by the first CRS 20A.

It may not always be possible to modify the CRS 20A with neutron shields or a smaller measurement footprint to reduce, eliminate, or substantially eliminate unwanted signal noise from the background. For example, in the case of a golf fairway, it may be unacceptable to install a CRS 20A in the middle of a fairway as it would obstruct golfers. In this case, the CRS 20A may have to be placed near or at the edge of a region of interest. In this position, the CRS 20A would measure significant signal from both the region of interest and the background region.

For this type of situation, it may be possible to compensate the first CRS 20A based on the detected signal noise from a second CRS 20B in the background region 7. Specifically, the second CRS 20B may be located in the background region 7, where this second CRS 20B can detect neutrons which can be determined to be background noise of the first CRS 20A. This second CRS 20B, or a plurality of second CRS 20B, may be installed in the background region 7 such that they measure only the background region 7 neutrons 12. If the background region 7 is small compared to the footprint of the first CRS 20A, then a second CRS 20B with a smaller measurement footprint may be utilized. During calibration of the first and second CRSs 20A, 20B, the signal from both the first CRS 20A, intended to measure the region of interest 4, and the signal from the second CRS 20B, intended to measure the background region 7, is recorded. The contribution of signal from both regions in the first CRS 20A is calculated or modeled, such that the signal from the second CRS 20B can effectively be parsed from the signal received by the first CRS 20A, thereby allowing for a determination of resulting wanted neutron signal from the region of interest by the first CRS 20A. Thus, this information can used to make corrections in the first CRS 20A for signal changes caused by changes in soil moisture of the background region 7.

Figure 8:
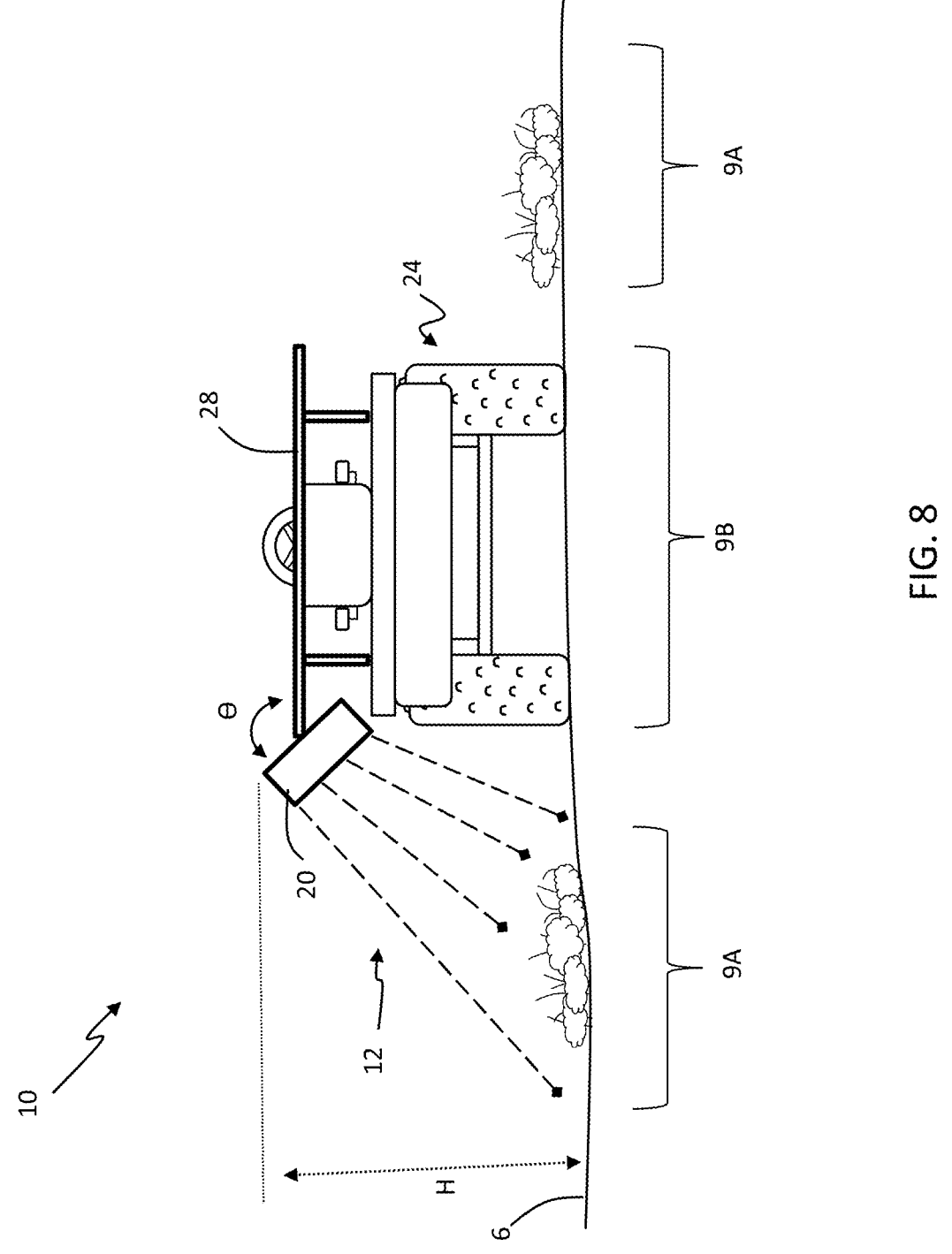
FIG. 8 is a diagrammatical illustration of a CRS configuration used in a cosmic ray sensing soil moisture management system, in accordance with exemplary embodiments of the present disclosure.

FIG. 8 is diagrammatical illustration of a CRS configuration used in a cosmic ray sensing soil moisture management system 10, in accordance with exemplary embodiments of the present disclosure. In particular, FIG. 8 illustrates another useful example of directionality of a CRS 20 based on mounting the CRS 20 in a configuration which is sensitive to both downward and lateral directions, which may be particularly useful for soil moisture management in agricultural settings. For instance, a directional CRS 20 can be attached to frame 28 of a moving vehicle 24, such as an ATV, trailer, tractor, vehicle, etc. and measuring a row of crops 9A while driving in a location 9B between the rows of crops 9A in a field. The directional CRS 20 could be sensitive directly downward or tilted at an angle which makes it sensitive to both downward and lateral directions. The CRS 20 can be positioned such that it touches the ground surface 6 or is above the ground by some amount. Its height, H, can be selected to maximize sensitivity to the region of interest. It may be positioned at an angle, θ, including, but not limited to, 0° to 90° degrees to maximize sensitivity to the region of interest.

While this configuration can be used in a field that is flood irrigated, or irrigated with sprinklers, it may be of particular interest for fields that have highly localized irrigation such as drip irrigation. In that case, the row of crops 9A in the irrigated region of interest may have relatively high soil moisture while the rows 9B between crops may be relatively dry. Examples include, but are not limited to, fields of drip irrigated beans or vines in vineyards. Crops of this kind may be difficult to measure with a standard, wide-area CRS 20 because only a fraction of the soil is wetted which produces a small contrast signal. A directional CRS 20, as described herein, can be used to produce a high spatial resolution moisture map of rows of irrigated crops 9A. It is noted that any positioning technique or system, such as GPS, LORAN, tricorders, or any other similar navigation/location technology may be used to identify the location of the mobile vehicle 24 relative to the rows of crops 9A or the rows 9B between crops.

With reference to all figures, and with any configuration or arrangement of the CRS 20, CRS soil moisture data may be used for irrigation prescriptions in turf management. Turf grass is a high value agricultural crop that must be maintained to very high quality. A standard CRS 20 may provide valuable information for use in effectively irrigating turf grass (golf courses, parks, fields, etc.). High spatial resolution CRS 20 also provides valuable information for use in effectively irrigating turf grass (golf courses, parks, fields, etc.). CRS 20 data can be valuable for irrigation systems with little or no individual control of subregions within their fields. It is also valuable for irrigation systems with a high level of individual control of subregions down to control of individual sprinkler heads. CRS mapping information can allow users with sophisticated irrigation systems to make better use of a high level of individual control of subregions of turf.

Regardless of the type of CRS 20 used, how that CRS 20 is configured or positioned, the resulting cosmogenic neutron data, or the derived soil moisture data, may be automatically transmitted from stationary or mobile CRS 20 systems to a central data repository and analysis computer, such as server 40, where data can be stored in database 44. In one of many alternatives, a user may gather CRS 20 data directly from the CRS 20 hardware via any known device, including but not limited to, USB or SD card, for example. Some or all calculations and calibrations may be performed locally inside the CRS 20 prior to data transmission, or at any convenient remote location before or after transmission, such as but not limited to, across a telephone network, satellites, remote computing sites, etc. Some or all calculations and calibrations may be performed in the server 40. The server 40 may be local, or it may be on the Internet or otherwise accessible through a computing network, such as the cloud.

Soil moisture data from both stationary and mobile CRS 20 units may be used to create an irrigation prescription or plan that optimizes irrigation to produce high quality turf grass. Overall irrigation may be increased or decreased as needed to improve soil moisture. This may mean increasing or decreasing the average soil moisture and/or making it more homogeneous throughout the turf. Irrigation may be increased in some regions and decreased in others as needed. The level of spatial control may depend upon the type of irrigation system, since irrigation systems may have different levels of spatial control, e.g., the extent of the ability to control portions of the irrigation system individually. An irrigation system that combines control over a group, e.g., 25 sprinkler heads, has less spatial control than one that offers control of each individual sprinkler head. The CRS data can be used in a way that is well matched to the spatial control of the irrigation system. For example, the CRS data can be used to provide localized, pinpointed, and dynamic control over individual sprinkler heads, or it can be used to control small or large regions of an environment.

Figure 9:
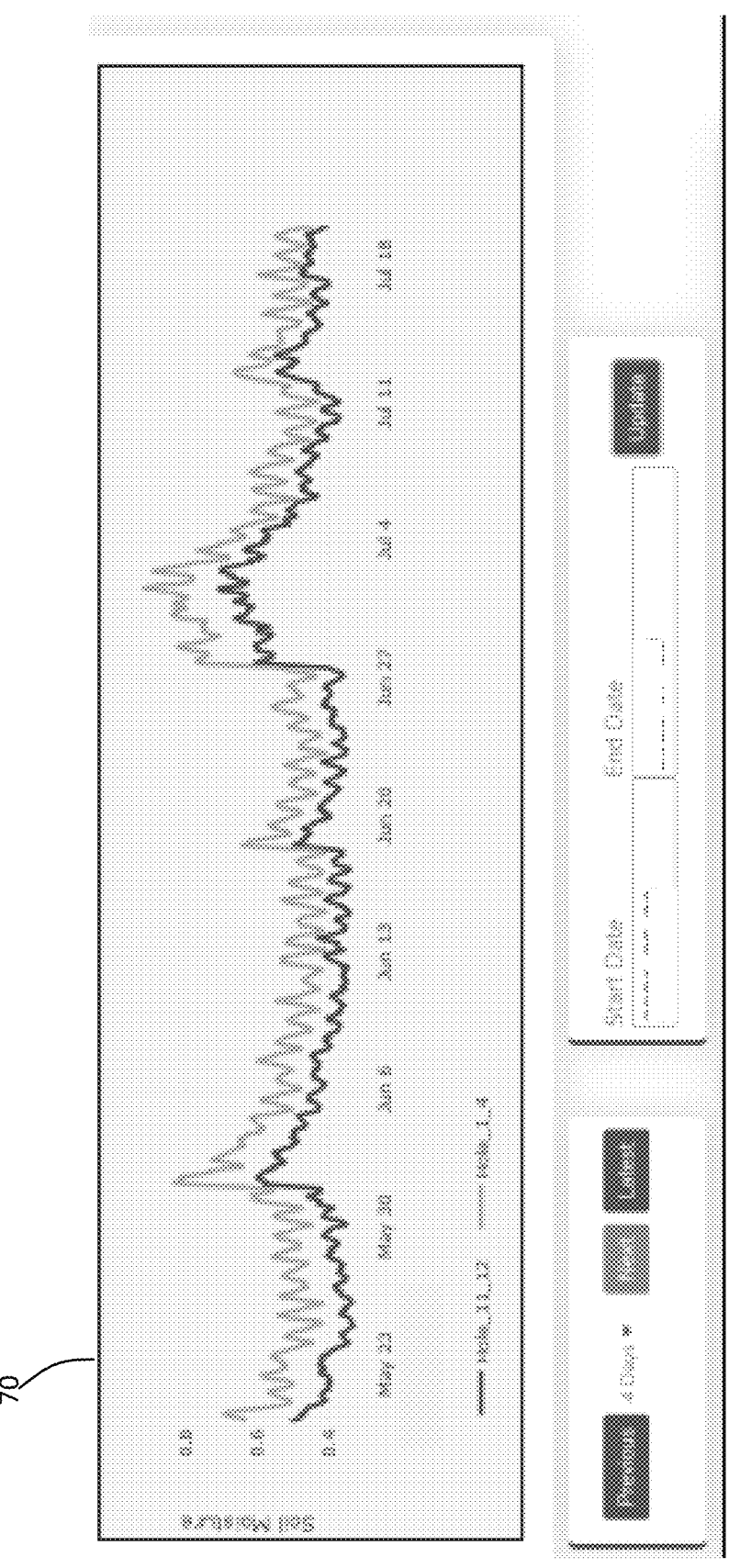
FIGS. 9-12 are illustrations of maps used in a cosmic ray sensing soil moisture management system, in accordance with exemplary embodiments of the present disclosure.

One output of the system 10 and the CRS 20 data may be the generation of maps and various visual references which can be used to review, analyze, or manage the irrigation of a particular location. To this end, FIGS. 9-12 are illustrations of maps used in a cosmic ray sensing soil moisture management system 10, in accordance with exemplary embodiments of the present disclosure. For example, FIG. 9 is a graphical visual 70 which provides a representation of data gathered from a stationary CRS over a period of time. As can be seen, the figure depicts the various levels of soil moisture over this period of time. Stationary CRS units may be configured to provide continuous or period data, which can be mapped or outputted in a visual manner in various ways, such that a user can gauge soil moisture at a particular time or over a period of time.

In another example, the system 10 may use mobile CRS to make soil moisture maps of turf using standard CRS mode or high-resolution CRS mode. In yet another example, it may use a system of both stationary and mobile CRS instruments with wireless connectivity to gather soil moisture data for a region of turf grass and create soil moisture maps at different spatial scales from high resolution to broad area. And, in another example, it may use soil moisture data and maps to create irrigation prescriptions for irrigation systems with differing levels of complexity and levels of individual control of individual or groups of watering devices including but not limited to sprinklers to drip irrigation to flood irrigation.

Figure 10:
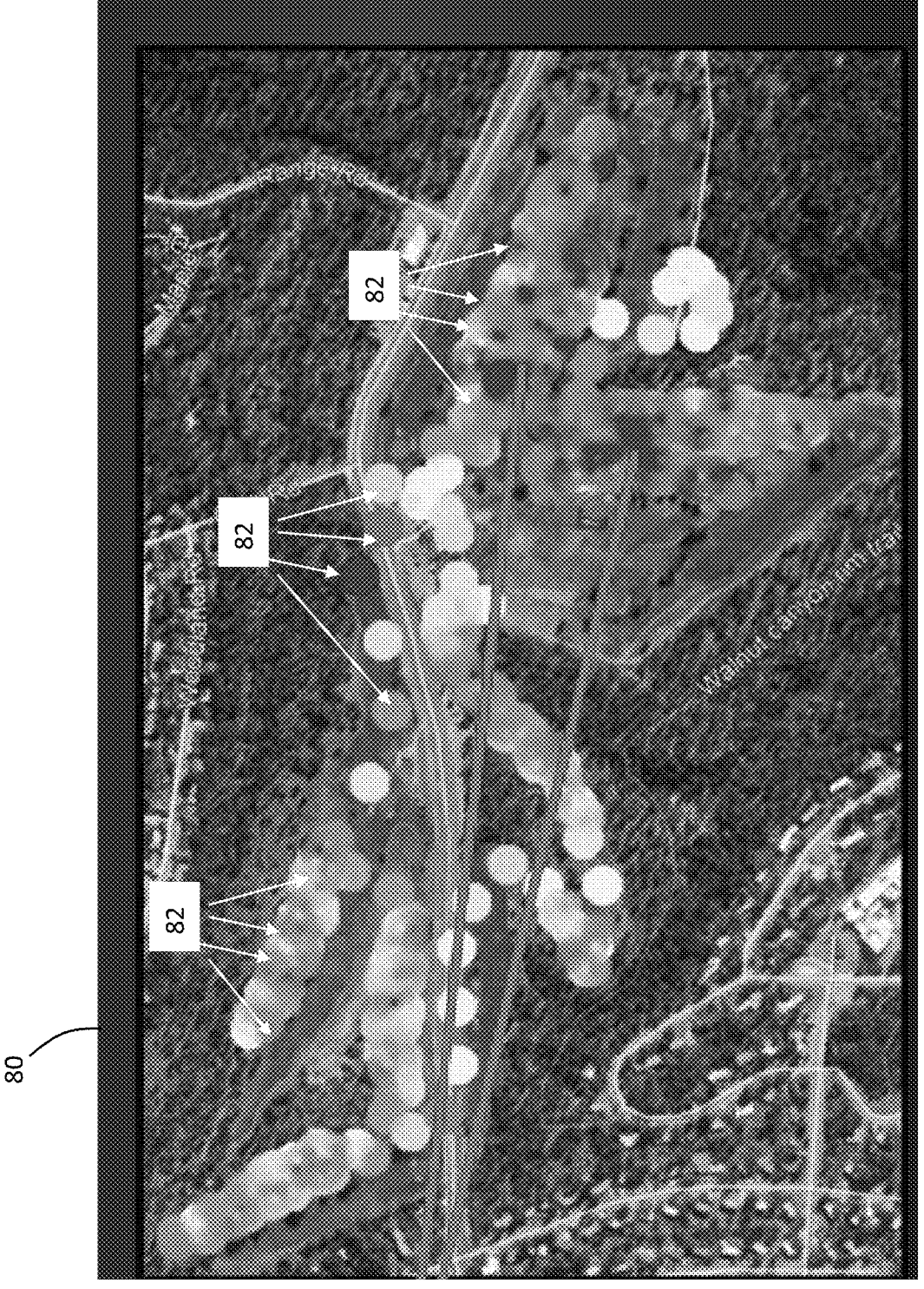

With regards to mobile CRS units, FIG. 10 illustrates a map 80 which depicts readings of a mobile CRS unit which is moved around an environment, where each circular area 82 within the map 80 represents one reading of the CRS unit, and the different colors of the circular areas 82 represent the soil moisture level. For instance, white and very light colors represent drier areas, whereas dark areas 82 represent areas of overwatering and oversaturation. FIG. 10 illustrates an environment in which the system 10 has not yet been used to manage irrigation, and as can be seen, there are clear areas where there is overwatering and other areas which are underwatered, such that there is inconsistent and inaccurate irrigation of the region.

Figure 11B:
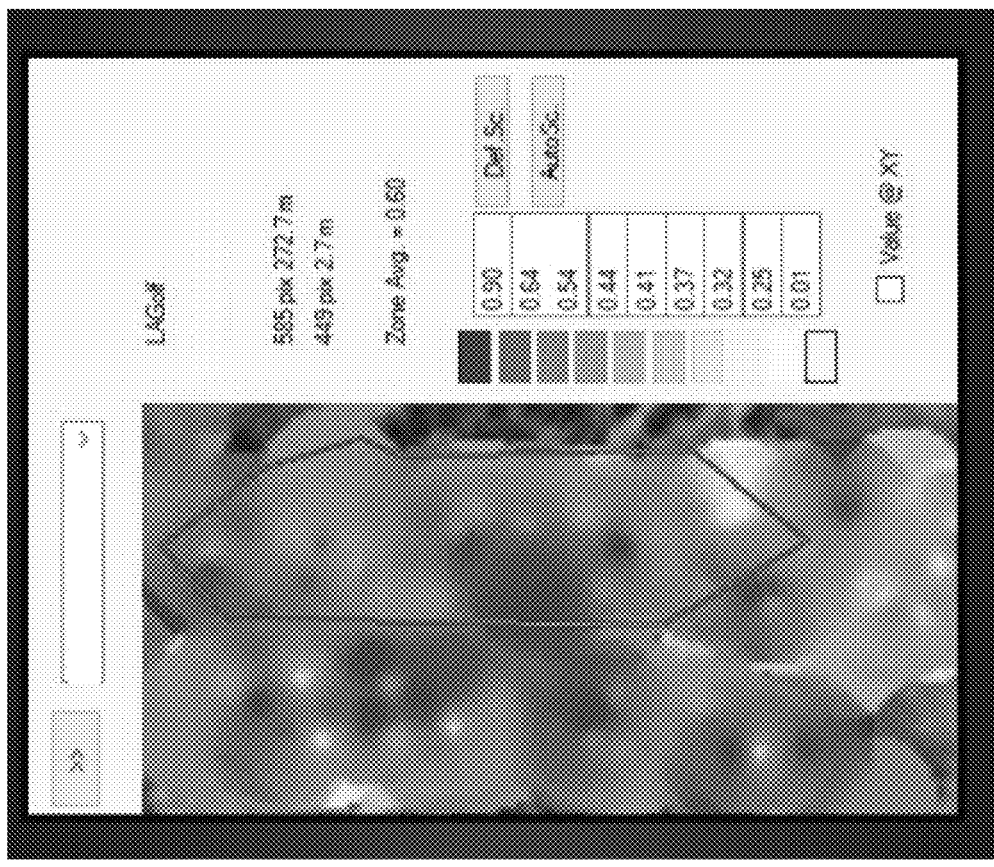
Figure 11A:
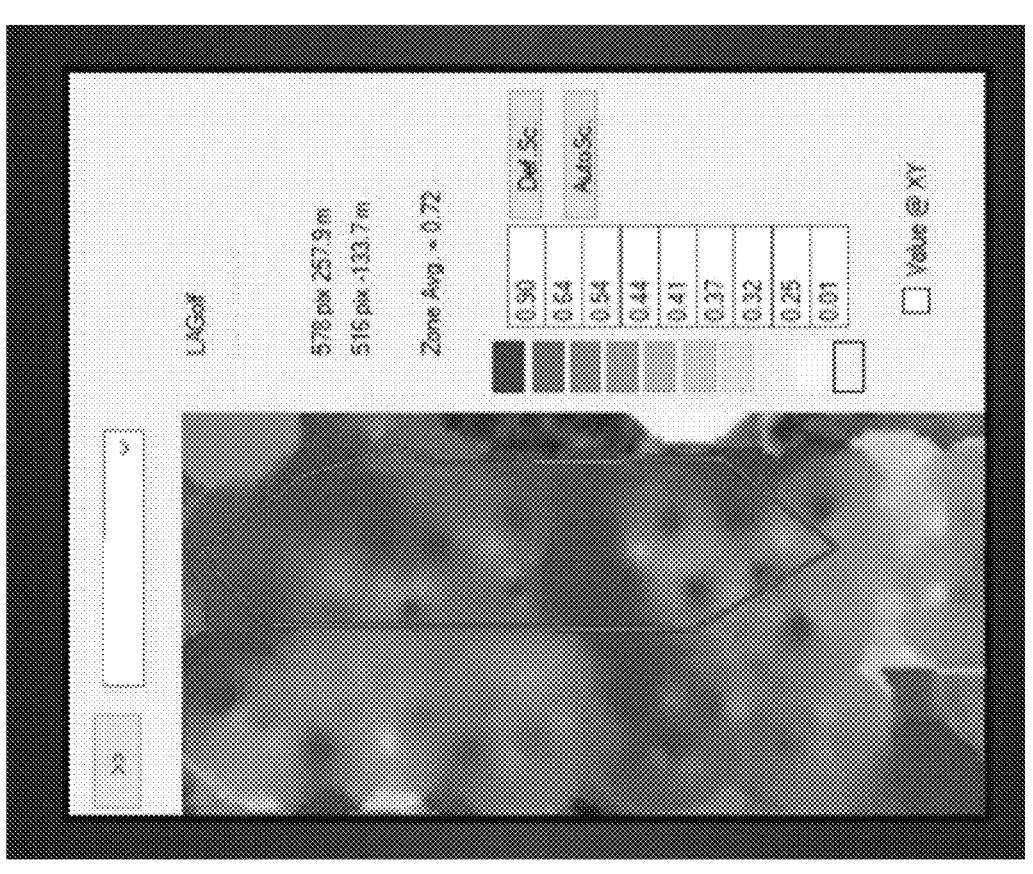
Figure 11D:
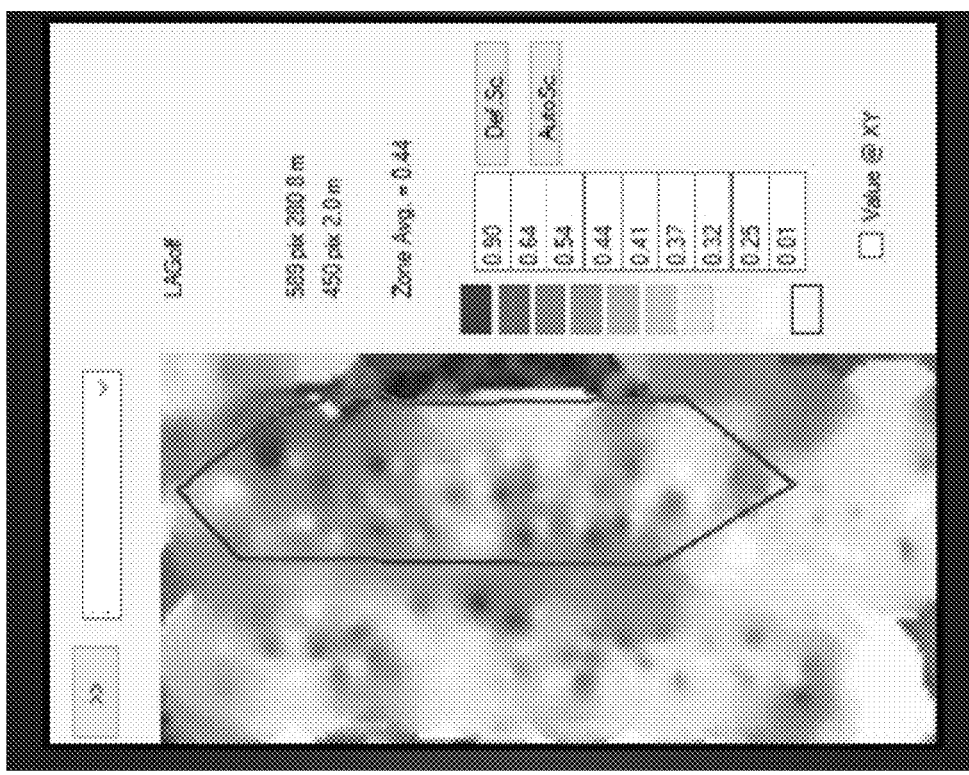
Figure 11D:
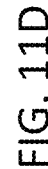
Figure 11C:
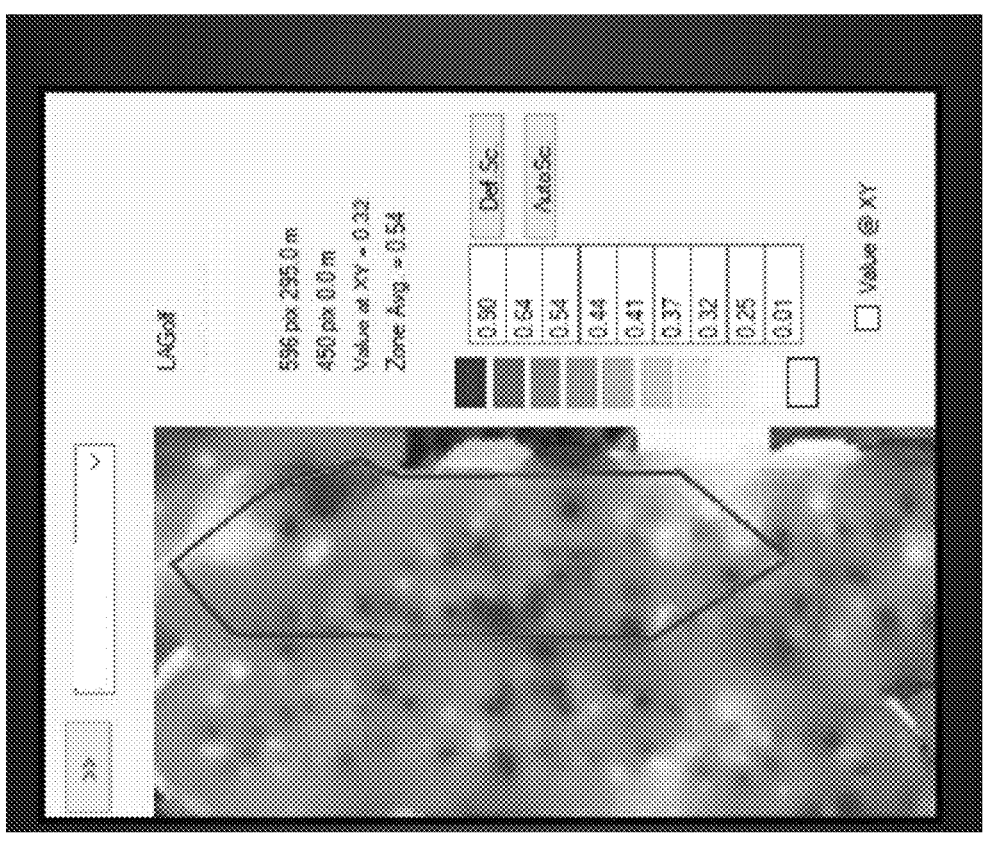
Figure 12:
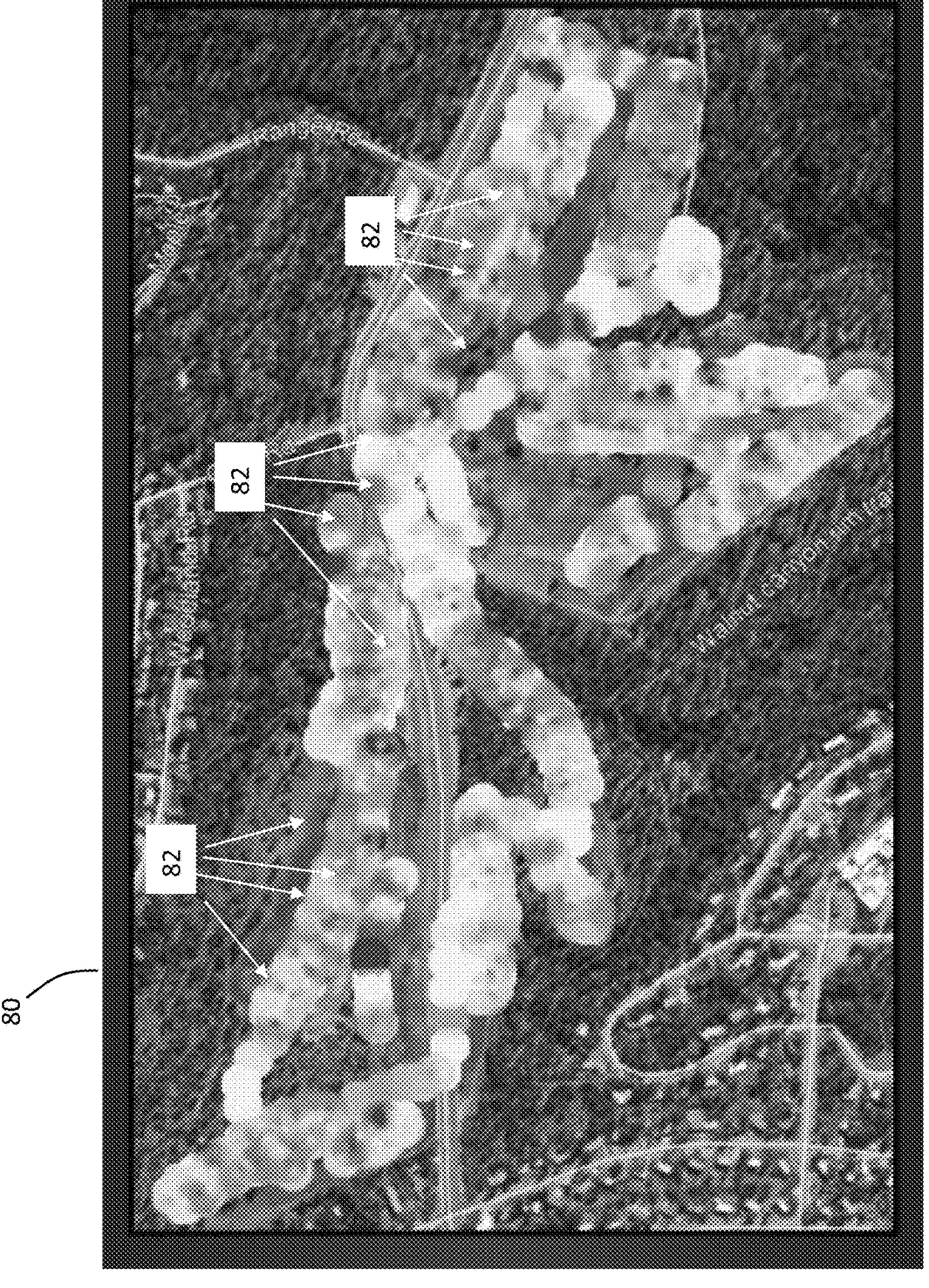

Starting with the soil moisture levels as depicted in FIG. 10, over a period of time, the system 10 was used on the geographical region of FIG. 10. FIGS. 11A-11D depict polygon region tool analysis of a subsection of the region of FIG. 10 corresponding to the overwatering and oversaturation, which shows a progression of soil moisture over a period of approximately 77 days. In FIG. 11A, the soil moisture was approximately 72% which is very high. With use of the system 10, approximately 9 days later the soil moisture had lowered to 60%, as shown in FIG. 11B. FIG. 11C depicts the same region approximately 70 days after the start, where the soil moisture had lessened to 54%, and in FIG. 11D, the region is depicted 77 days after the start, where the soil moisture is 44%. FIG. 12 illustrates the entirety of the region depicted in FIG. 10 after the use of the system 10 for 77 days, where the circular areas 82 are significantly more consistent in color, indicating a greater uniformity of soil moisture within the region.

In further detail of the system 10 and the use of maps and mapping techniques, mobile CRSs may be used to produce maps of soil moisture. Mobile CRSs measure neutron signals in a small footprint around the mobile vehicle they're carried on. Typical effective footprint may be a small, circular radius, such as a circle radius 25 meters or less, but other sizes and shapes are possible. Data are collected as the mobile CRS moves across the region being mapped. CRS measurements are made frequently, e.g., every 10 or 20 seconds, but other measurement periods are possible. Simultaneous GPS measurements record the location of the mobile CRSs at the time of each CRS measurement.

The time sequence of measurements may be plotted on a 2-D grid to create the map. The map is divided into a grid of pixels. Each pixel may represent a small region of the map. The soil moisture at a pixel may be measured as the weighted average of all the CRS measurements within the CRS-footprint range of that pixel. The weighting function can be a function of the distance between the location of the pixel and the location of the mobile CRS at each measurement. Examples of weighting functions of this distance include but are not limited to constant, inverse, inverse-squared, and exponential functions of the distance.

After all measurements are collected and all weighted-average pixel values are calculated, non-zero pixels are color coded using either a predetermined or user-editable color coding scale. The grid of color coded pixels comprises a map of soil moisture values. This grid can be represented as a digital image in a format such as but not limited to BMP, TIFF, and/or JPEG.

Measurements from an individual mobile CRS may be transmitted to a server. The server then calculates the soil moisture at each measurement location, records the measurements, calculations, and locations in a database, and saves the database and digital-image map to permanent storage on a disk. Measurements from a subsequent mobile CRS for the same day and map are calculated in the same way. Then those subsequent measurements may be combined with previous measurements from the same or other mobile CRSs for the same day and map, then the server plots the new map of combined mobile CRSs measurements, saving the new and previous measurements and map in the database.

Measurements can be communicated to the server by methods including but not limited to physical media and Internet TCP/IP. The server can provide data to end-user graphical-interface software (GUIs). GUIs include but are not limited to web browsers and C#Analyzers. For web browsers, the server can compute a list of all available maps for a particular location, then present to the user a menu allowing the user to select from available maps. The server delivers a selected map over a communication mechanism such as but not limited to TCP/IP using HTML. For C#Analyzers, the server can deliver numeric outputs, including but not limited to charts, tables, or digital arrays. In one example, the server can provide a 2D numerical array of soil-moisture values per pixel. The numerical array of volumetric soil-moisture values can be limited to 2 significant digits ranging from 0 to 100, and 255 representing grid pixels containing no measurement value, such that this numerical array can be transmitted as 1 byte per pixel. The array can be zipped to reduce bandwidth requirement.

The array can be transmitted from the server to the C#Analyzer over a communication mechanism such as but not limited to TCP/IP. The C#Analyzer can receive this array, unzip the payload, and display the array as a map in a GUI. The C#Analyzer can allow the user to select a subregion of the map using the GUI, calculate the average or other statistic of soil moisture values for the subregion, present calculated statistics to the user through the GUI, and save the subregion for subsequent analyses of other data sets on other maps representing other data such as but not limited to CRS measurements from other days. The C#Analyzer can maintain a database of the user-generated subregions, allowing the user to select different subregions for analyses of same subregions between different maps of different data.

Golf-course superintendents, farm managers, or other users can use the map of soil moisture to evaluate soil-moisture magnitude and uniformity. Computer-controlled irrigation systems, such as those discussed relative to FIG. 1, can reduce water placement on subregions determined to be too wet and increase water placement on subregions determined to be too dry. Goals to reduce irrigation water use can be achieved by reducing water placement while using a map of soil moisture to maintain irrigation uniformity across the region. Server soil moisture data can be delivered to computer-controlled irrigation systems to achieve automated irrigation optimization, using automated control mechanisms including but not limited to bang-bang, optimal, and non-linear control.

Generally, a CRS on a mobile platform that is producing a soil moisture map of a region of interest can operate freely. For example, a user driving a mobile CRS measurement system may attempt to drive over the surface smoothly and evenly and produce a uniform measurement pattern. For a particular region of interest, an optimal mapping routine may be defined by calculation or modeling. For example, the optimal speed of a mobile system may depend upon detector sensitivity, altitude and the desired measurement uncertainty. Additionally, it may be beneficial to ensure specific field locations covered by the detector. To that end, a mapping prescription which includes the physical path of travel over the region of interest, speed of travel and dwell time at specific locations may be generated. This mapping prescription may be displayed on a GPS enabled computer, tablet or phone such that a driver may follow the prescription as they drive the CRS mobile instrument over the region of interest. This process aids the driver in producing a set of mapping data that is close to optimal.

Additionally, the mapping prescription may be used by an automated, robotic platform to automatically drive over the region of interest and collect data according to the mapping prescription. A benefit of a robotic device is that it may drive over the surface more slowly and evenly than would typically be achievable by a human operator. This may produce a better, more uniform, mapping data set. Both human driven and robotic mobile system may also be used to generate mapping data without a specific mapping prescription. That is, they may drive freely over the region of interest without following pre-set instructions.

FIG. 13 is a flowchart illustrating a method of cosmic ray sensing soil moisture management 100, in accordance with exemplary embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, at least one cosmic ray sensor (CRS) is positioned within an environment. A plurality of cosmogenic neutrons is detected from a portion of the environment with the CRS (block 104). Data corresponding to the detected plurality of cosmogenic neutrons is communicated to a computing platform in communication with the at least one CRS (block 106). Using a processing system within the computing platform, a moisture level within the portion of the environment is determined based on the detected plurality of cosmogenic neutrons, whereby the processing system is configured to activate an irrigation controller, the irrigation controller controlling an irrigation network positioned at least partially within the portion of the environment based on the determined moisture level (block 108). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure.

What is claimed is:

1. A cosmic ray sensing soil moisture management system comprising:
   at least two cosmic ray sensors (CRSs) positioned within an environment and above a ground surface, wherein the CRSs detects a plurality of cosmogenic neutrons from a portion of the environment, and wherein the at least two CRSs have an at least partially overlapping measurement field;
   a computing platform in communication with the at least two CRSs, wherein data corresponding to the detected plurality of cosmogenic neutrons is communicated to the computing platform; and
   a processing system within the computing platform, wherein the processing system determines a moisture level within the portion of the environment based on the detected plurality of cosmogenic neutrons, wherein the processing system is configured to activate an irrigation controller, the irrigation controller controlling an irrigation network positioned at least partially within the portion of the environment based on the determined moisture level.

2. The cosmic ray sensing soil moisture management system of claim 1, wherein the at least one of the at least two CRSs is carried on a mobile vehicle which moves through the environment.

3. The cosmic ray sensing soil moisture management system of claim 2, wherein the mobile vehicle operates without a human driver.

4. The cosmic ray sensing soil moisture management system of claim 1, wherein the at least one of the at least two CRSs is positioned on a substantially stationary object within the environment.

5. The cosmic ray sensing soil moisture management system of claim 1, wherein the at least two CRSs further comprises at least one of:
   a wide-area CRS having a shield positioned only on a top surface thereof;
   a wide-area CRS having a shield positioned only on the top surface thereof and immediately below a bottom surface thereof;
   an intermediate-area CRS having a shield positioned on a top surface thereof and on a portion of the lateral sides thereof;
   a local-area CRS having a shield positioned on the top surface thereof and on an entirety of the lateral sides thereof; or
   a laterally-directional CRS having a shield positioned on the top surface thereof and only on one lateral side thereof.

6. The cosmic ray sensing soil moisture management system of claim 1, wherein a first CRS of the at least two CRSs is a primary CRS for detecting the plurality of cosmogenic neutrons from the portion of the environment, and wherein a second CRS of the at least two CRSs is a background CRS for detecting background noise of the first CRS and the detected plurality of cosmogenic neutrons from the portion of the environment, wherein the determined moisture level within the portion of the environment based on the detected plurality of cosmogenic neutrons from the first CRS is corrected based on the detected background noise from the second CRS.

7. The cosmic ray sensing soil moisture management system of claim 1, further comprising at least one computerized display device in communication with the computing platform, wherein a display screen of the at least one computerized display device displays at least one map depicting an image of the determined moisture level within the portion of the environment based on the detected plurality of cosmogenic neutrons.

8. The cosmic ray sensing soil moisture management system of claim 7, wherein the at least one map further comprises a pixelated map with a grid of pixels, wherein pixels represent portions of the environment and are displayed with different colors.

9. The cosmic ray sensing soil moisture management system of claim 8, wherein the at least one of the at least two CRSs is carried on a mobile vehicle which moves through the environment, and wherein each pixel in the grid of pixels is measured as a weighted average of CRS measurements within a CRS footprint range of that pixel, wherein a weighting function is a function of a distance between a location of a pixel and a physical location of the mobile vehicle in the environment at each measurement.

10. The cosmic ray sensing soil moisture management system of claim 1, wherein the environment further comprises a golf course having turf grass and sand traps.

11. A cosmic ray sensing soil moisture management system comprising:
   at least one cosmic ray sensor (CRS) positioned within an environment, wherein the CRS detects a plurality of cosmogenic neutrons from a portion of the environment;

a computing platform in communication with the at least one CRS, wherein data corresponding to the detected plurality of cosmogenic neutrons is communicated to the computing platform;

a processing system within the computing platform, wherein the processing system determines a moisture level within the portion of the environment based on the detected plurality of cosmogenic neutrons, wherein the processing system is configured to activate an irrigation controller, the irrigation controller controlling an irrigation network positioned at least partially within the portion of the environment based on the determined moisture level; and wherein the CRS is movable in at least one of: a vertical direction, whereby a position of elevation of the CRS is adjustable; or an angular tilt direction, whereby an angle of measurement of the CRS is adjustable.

12. A cosmic ray sensing soil moisture management method, the method comprising:

positioning at least two cosmic ray sensors (CRSs) within an environment and above a ground surface, wherein the at least two CRSs have an at least partially overlapping measurement field;

detecting a plurality of cosmogenic neutrons from a portion of the environment with the CRSs;

communicating data corresponding to the detected plurality of cosmogenic neutrons to a computing platform in communication with at least one of the at least two CRSs; and using a processing system within the computing platform, determining a moisture level within the portion of the environment based on the detected plurality of cosmogenic neutrons, whereby the processing system is configured to activate an irrigation controller, the irrigation controller controlling an irrigation network positioned at least partially within the portion of the environment based on the determined moisture level.

13. The cosmic ray sensing soil moisture management method of claim 12, further comprising the step of carrying at least one of the at least two CRSs through the environment on a mobile vehicle which moves through the environment.

14. The cosmic ray sensing soil moisture management method of claim 12, further comprising the step of positioning at least one of the at least two CRSs on a substantially stationary object within the environment.

15. The cosmic ray sensing soil moisture management method of claim 12, further comprising moving at least one of the at least two CRSs in at least one of: a vertical direction, whereby a position of elevation of the CRS is adjustable; or an angular tilt direction, whereby an angle of measurement of the CRS is adjustable.

16. The cosmic ray sensing soil moisture management method of claim 12, wherein a first CRS of the at least two CRSs is a primary CRS for detecting the plurality of cosmogenic neutrons from the portion of the environment, and wherein a second CRS of the at least two CRSs is a background CRS for detecting background noise of the first CRS and the detected plurality of cosmogenic neutrons from the portion of the environment, wherein the determined moisture level within the portion of the environment based on the detected plurality of cosmogenic neutrons from the first CRS is corrected based on the detected background noise from the second CRS.

17. The cosmic ray sensing soil moisture management method of claim 12, further comprising:

providing at least one computerized display device in communication with the computing platform; and displaying, on a display screen of the at least one computerized display device, at least one map depicting an image of the determined moisture level within the portion of the environment based on the detected plurality of cosmogenic neutrons.

18. The cosmic ray sensing soil moisture management method of claim 17, wherein the at least one map further comprises a pixelated map with a grid of pixels, wherein pixels represent portions of the environment and are displayed with different colors.

19. The cosmic ray sensing soil moisture management method of claim 18, wherein at least one of the at least two CRSs is carried on a mobile vehicle which moves through the environment, and wherein each pixel in the grid of pixels is measured as a weighted average of CRS measurements within a CRS footprint range of that pixel, wherein a weighting function is a function of a distance between a location of a pixel and a physical location of the mobile vehicle in the environment at each measurement.

* * * * *